(12) United States Patent
Sato

(10) Patent No.: US 6,493,512 B2
(45) Date of Patent: Dec. 10, 2002

(54) STEP ZOOM LENS CAMERA

(75) Inventor: Norio Sato, Tokyo (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/941,642

(22) Filed: Aug. 30, 2001

(65) Prior Publication Data
US 2002/0025149 A1 Feb. 28, 2002

(30) Foreign Application Priority Data
Aug. 31, 2000 (JP) ....................... 2000-264110

(51) Int. Cl.$^7$ .............................................. G03B 17/00
(52) U.S. Cl. .......................................... 396/83; 396/88
(58) Field of Search ........................... 396/83, 529, 79, 396/88; 359/694, 696, 697, 698, 699, 700, 701

(56) References Cited

U.S. PATENT DOCUMENTS

| | | | | |
|---|---|---|---|---|
| 4,334,746 A | * | 6/1982 | Nozawa et al. | 396/88 |
| 6,101,335 A | * | 8/2000 | Onda | 396/79 |
| 6,122,113 A | * | 9/2000 | Okamoto | 359/699 |
| 6,163,412 A | * | 12/2000 | Onda | 359/696 |
| 6,268,964 B1 | | 7/2001 | Ozaki et al. | 359/685 |

FOREIGN PATENT DOCUMENTS

JP 2000-199843 7/2000 ............ G02B/7/04

* cited by examiner

Primary Examiner—W. B. Perkey
(74) Attorney, Agent, or Firm—Greenblum & Bernstein, P.L.C.

(57) ABSTRACT

A step zoom lens camera includes a rotatable cam ring, a cam groove formed on the cam ring, including step areas, a linear movement member which is connected to the cam ring, and a cam-guided lens group which is guided by the linear movement member to move linearly in the optical axis direction in accordance with the cam groove so as to move to an in-focus position of an object within each step area of the cam groove. The cam ring is provided on the rear end surface thereof with step area indicating indexes representing the corresponding step areas. The linear movement member is provided with a reference index at a predetermined circumferential position thereof, so that the position of use of the cam groove can be visually confirmed by viewing the position of the step area indicating indexes relative to the reference index.

9 Claims, 18 Drawing Sheets

STEP ZOOM LENS CAMERA

BACKGROUND OF THE INVENTION

1. Field of the Invention

The present invention relates to a step zoom lens camera in which a focusing operation is carried out by controlling the angular displacement of a cam ring having a cam groove.

2. Description of the Related Art

In classical zoom lenses, upon zooming, a plurality of variable power lens groups are moved along predetermined zooming path, so that the focal length can be varied without moving the focal position. In a shutter release operation, a focusing lens group is moved in accordance with the object distance. The focusing lens group is either provided separately from the variable power lens groups or is formed by one of the variable power lens groups. Classical zoom lenses of this kind have been used for a mechanical zoom lens in which a cam ring having cam grooves is manually or electrically rotated in a stepless fashion.

A step zoom lens has been used for a lens in which the angular displacement of the cam ring with cam grooves is pulse-controlled. In such a step zoom lens, the focal length from the telephoto extremity to the wide angle extremity is divided into a plurality of (finite number of) focal length steps. The angular displacement of the cam ring is controlled at each focal length step so as to focus on an object of any distance between the infinite object distance and the closest (minimum) object distance, during the focusing operation while the zooming operation is carried out. The angular distance of the cam ring is pulse-controlled so that the object is in-focus in accordance with the focal length belonging to a specific focal length step determined in accordance with object distance data.

In the step zoom lens, if an area of the cam ring outside of the effective area (step area) of the cam grooves is used upon focusing, due to a deviation of the attachment angle of the cam ring, an out-of-focus (defocus) state occurs. Such defocusing in a zoom lens is caused by other various reasons. In particular, in a step zoom lens, it is preferable that whether or not the cam groove area is correctly used at each focal length step (i.e., whether or not the angular position of the cam ring is appropriate) be easily checked. In some types of step zoom lenses, the step area of the cam grooves includes an adjustment area for focus adjustment in addition to a cam groove area for focusing over the object distance from the infinite object distance to the closest object distance. Accordingly, it is preferable to be able to easily identify the area of the step area, which includes the adjustment area, which is actually being used.

SUMMARY OF THE INVENTION

It is an object of the present invention to provide a step zoom lens camera in which the state of use of the cam groove at each focal length step or the angular displacement of the cam ring can be easily confirmed.

In order to achieve the above mentioned object, a step zoom lens camera is provided including a rotatable cam ring; a cam groove formed on the cam ring, the cam groove including a plurality of step areas, formed by splitting a focal length from the wide angle extremity to the telephoto extremity, and transit areas which connect the plurality of step areas to form a step zoom path; a linear movement member which is connected to the cam ring so as to rotate relative thereto and to move together in the optical axis direction; and a cam-guided lens group which is guided by the linear movement member to move linearly in the optical axis direction in accordance with the cam groove so as to move to an in-focus position of an object, from an infinite object distance to a closest object distance, within a step area of the cam groove. The cam ring is provided on the rear end surface thereof with a plurality of step area indicating indexes which are spaced from one another in the circumferential direction to represent the corresponding step areas. The linear movement member is provided with a reference index at a predetermined circumferential position thereof, so that the position of use of the cam groove can be visually confirmed by viewing the position of the step area indicating indexes relative to the reference index.

In an embodiment, the step zoom lens camera further includes a focusing lens group which serves as a variable power lens group, in addition to the cam-guided lens group which is guided by the cam groove, the focusing lens group being moved in the optical axis direction in a linear relationship to the angular displacement of the cam ring when the cam ring is rotated.

In an embodiment, the linear movement member includes an annular portion which covers the rear end surface of the cam ring, wherein the reference index includes a window which extends through the annular portion and which is elongated in the circumferential direction. The cam-guided lens group is guided in each step area of the cam groove when each step area indicating index is located in the window.

Preferably, each of the step area indicating indexes is a recess formed on the rear end surface of the cam ring.

Preferably, the cam groove is provided with an accommodation area which is adapted to hold the cam-guided lens group in an accommodation position at which no photographic exposure is carried out. The cam ring is provided on the rear end surface thereof with an accommodation area indicating index which represents the position of the accommodation area in the circumferential direction.

Preferably, each step area of the cam groove includes a focusing area in which the cam-guided lens group is moved to a focal position in which an object from an infinite distance to the closest distance can be focused on, in accordance with the rotation of the cam ring; and adjustment areas which are provided on opposite sides of the focusing area and which are adapted to move the cam-guided lens group in the optical axis direction while maintaining a focusing function, when the angular position of the cam ring is changed.

In an embodiment, the step areas of the cam groove have different lengths, and a length of the window in the circumferential direction corresponds to a longest step area of the step areas. Each the step area indicating indexes is positioned at one and the other ends of the window when the cam-guided lens group is guided at a corresponding one and the other ends of each corresponding the step area.

In an embodiment, the step area indicating indexes have different lengths in the circumferential direction.

According to another aspect of the present invention, a step zoom lens camera is provided, in which the focal length from the telephoto extremity to the wide angle extremity is split into a finite number of focal length steps, so that a zoom lens system can be moved to a focal position in which an object from a infinite distance to the closest distance can be focused on, by controlling the angular displacement of a cam ring with a cam groove at each focal length step to vary the focal length. The cam ring is provided on the rear end surface thereof with a plurality of step indicating indexes which are spaced from one another in the circumferential direction to represent the angular position of the cam ring corresponding to the focal length steps. A linear movement member is provided with a reference index at a predetermined circumferential position thereof, the linear movement member is connected to the cam ring so as to rotate relative thereto and to move together in the optical axis direction. The angular position of the cam groove at each focal length step can be visually confirmed by viewing the relative position of the step indicating indexes relative to the reference index.

The present disclosure relates to subject matter contained in Japanese Patent Application No. 2000-264110 (filed on Aug. 31, 2000) which is expressly incorporated herein by reference in its entirety.

BRIEF DESCRIPTION OF THE DRAWINGS

The invention will be discussed below with reference to the drawings, in which.

DESCRIPTION OF THE PREFERRED EMBODIMENT

The illustrated embodiment is applied to a camera having a two-lens group zoom lens. A zoom lens barrel 11 of a step zoom lens camera will be generally discussed below with reference to FIGS. 1 through 9, and the features of the present invention will be explained with further reference to FIGS. 10 through 23. Note that in the following description, an optical axis direction or a direction parallel with the optical axis refers to the direction extending along the optical axis O of the photographing lens of an assembled camera.

Figure 1:
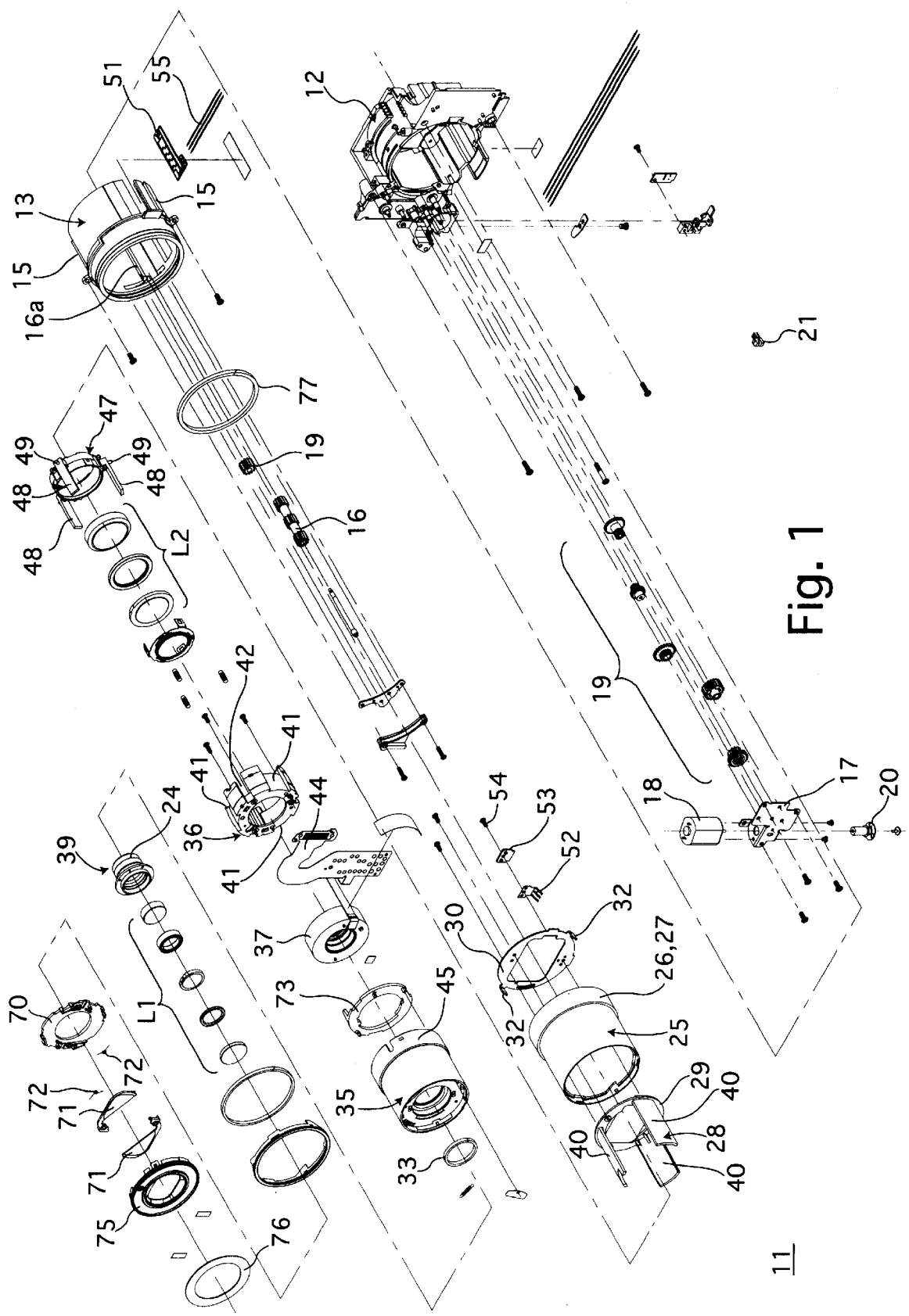
FIG. 1 is an exploded perspective view of a zoom lens barrel in a step zoom lens camera according to an embodiment of the present invention.
Figure 2:
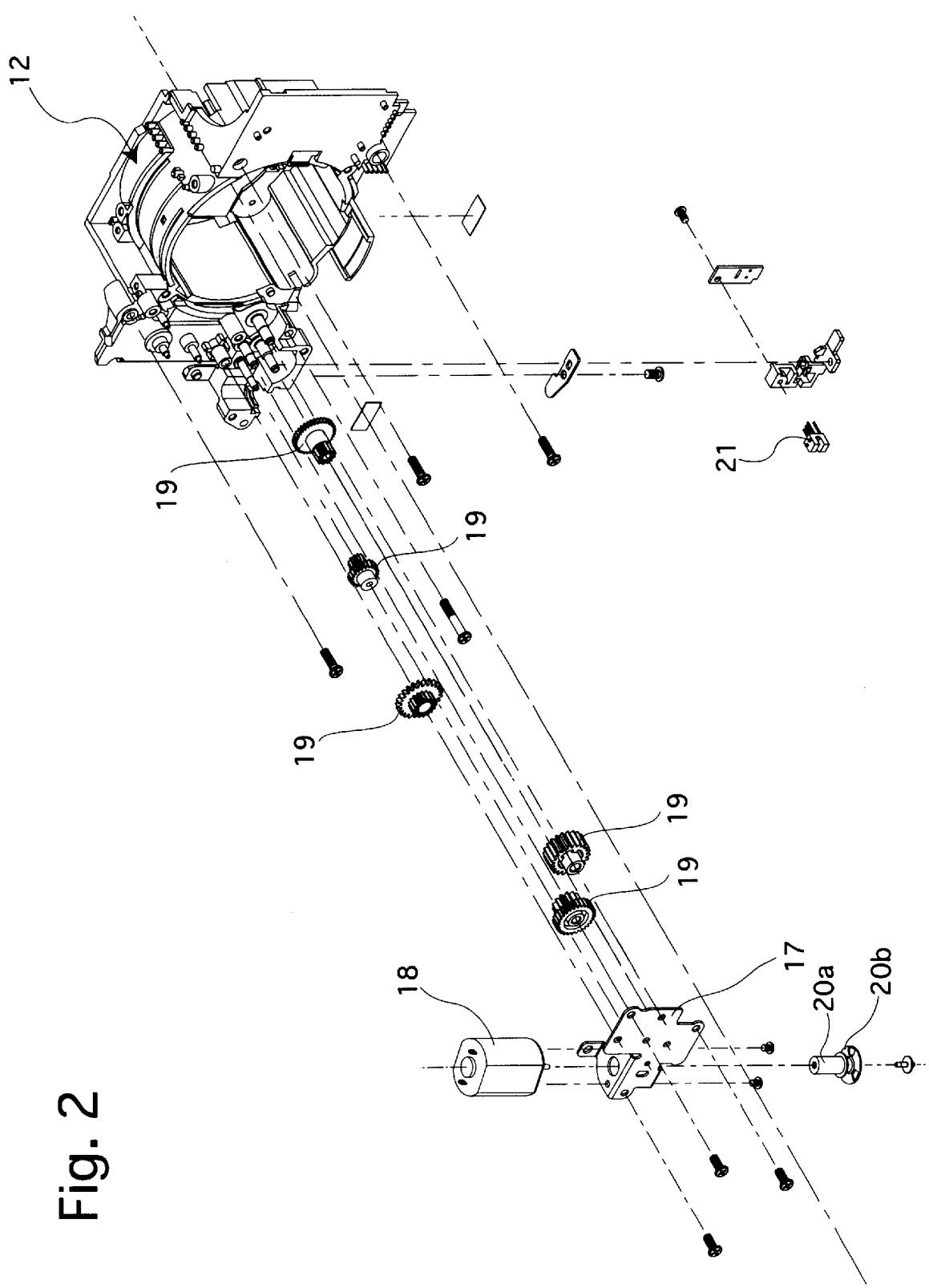
FIG. 2 is an enlarged exploded perspective view of a portion of a zoom lens barrel shown in FIG. 1.

As shown in, for example, FIG. 1, a stationary barrel 13 is secured in a housing 12 secured to the camera body. The stationary barrel 13 is provided on its inner peripheral surface with a female helicoid 14 (see FIG. 6) which is partly cut to form a pair of linear movement guide grooves 15 parallel with the optical axis O.

Figure 3:
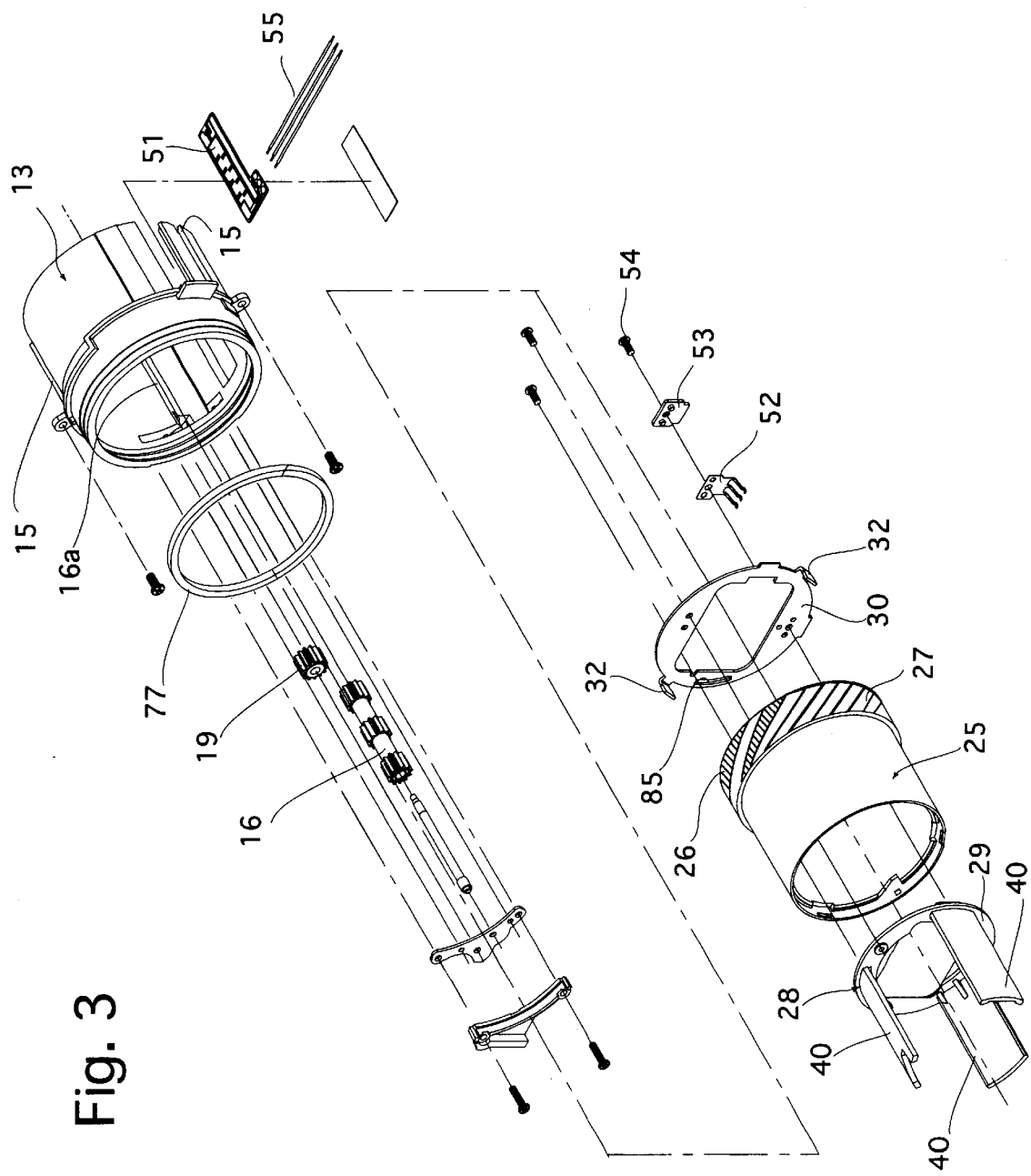
FIG. 3 is an enlarged exploded perspective view of a portion of a zoom lens barrel shown in FIG. 1.

As shown in FIGS. 1 and 3, the stationary barrel 13 is provided with an elongated cut-away portion 16a which extends in the optical axis direction, wherein a multiple pinion 16 is installed in the cut-away portion 16a. The multiple pinion 16 is supported to rotate about an axis parallel with the optical axis O and is provided with a tooth surface which projects into the stationary barrel 13. A zoom motor 18 is attached to the housing 12 via a motor support plate 17. The rotation of the drive shaft of the zoom motor 18 is transmitted to the multiple pinion 16 via a zoom gear train 19.

The zoom motor 18 is provided on its drive shaft with a worm gear 20a and a slit disc 20b secured thereto, having a plurality of slits, so that the amount of drive of the zoom motor 18 can be detected by detecting the amount of rotation of the slit disc 20b by a photo-interrupter 21. Since the amount of feed (forward movement) or retraction (rearward movement) of the zoom lens barrel 11 is determined in accordance with the amount of drive of the zoom motor 18, it is possible to pulse-control the angular displacement of a cam ring 25 which will be discussed hereinafter, via a pulse detection mechanism constructed from the slit disc 20b and the photo-interrupter 21.

The female helicoid 14 of the stationary barrel 13 is screw-engaged with a male helicoid 26 formed on the outer peripheral surface of the cam ring 25 in the vicinity of the rear end of the cam ring 25. The width of the male helicoids 26 in the optical axis direction is such that the male helicoid 26 is not exposed to the outside when the cam ring 25 is moved forward to a maximum position. The cam ring 25 is provided, on the peripheral surface thereof on which the male helicoid 26 is formed, with a plurality of outer peripheral gear portions 27 parallel with the male helicoid 26. The teeth of the outer peripheral gear portions 27 are parallel with the optical axis O and are engaged with the multiple pinion 16.

A linear movement guide ring 28 is provided in the cam ring 25. The linear movement guide ring 28 is provided on its rear end with a radially and outwardly extending flange 29. A linear movement guide plate (linear movement member) 30 is secured to the rear end of the linear movement guide ring 28. The linear movement guide ring 28 is connected to the cam ring 25 so as to move together in the optical axis direction but so as to relatively rotate by holding an inner flange 31 (see FIG. 6) provided at the rear end of the cam ring 25 between the outer flange 29 and the linear movement guide plate 30.

The linear movement guide plate 30 is provided with a pair of linear movement guide projections 32 that are spaced in the circumferential direction and that extend radially and outwardly. The respective linear movement guide projections 32 are slidably engaged in the linear movement guide grooves 15 formed in the stationary barrel 13. Consequently, the linear movement guide ring 28 and the linear movement guide plate 30 are moved together with the cam ring 25 in the optical axis direction but are not rotatable about the optical axis O relative to the stationary barrel 13. Namely, the linear movement guide ring 28 and the linear movement guide plate 30 are guided to move linearly.

The cam ring 25 and the linear movement guide ring 28 constitute a first feed portion of the zoom lens barrel 11. In the first feed portion, when the multiple pinion 16 is rotated by the zoom motor 18 in the lens feed direction, the cam ring 25 is rotated via the outer peripheral gear portions 27. Consequently, the cam ring 25 is moved forward from the stationary barrel 13 in accordance with the relationship between the female and male helicoids 14 and 26. At the same time, the linear movement guide ring 28 is moved in the optical axis direction together with the cam ring 25 while being guided to move linearly with respect to the stationary barrel 13, since the linear movement guide ring 28 and the cam ring 25 are connected to each other so as to be relatively rotatable.

A lens support barrel 35 is provided between the cam ring 25 and the linear movement guide ring 28. A shutter mount ring 36 is secured to the inside of the lens support barrel 35 and a shutter block 37 is secured to the front end of the shutter mount ring 36. The shutter block 37 is provided with a shutter drive motor 34 (FIG. 9) incorporated therein, to open and close shutter blades 38 (see FIG. 6), so that the shutter blades 38 can be opened and closed in response to shutter opening and closing signals which are supplied from a CPU 60 (FIG. 9) through a flexible printed circuit (FPC) board 44 for the shutter.

Figure 6:
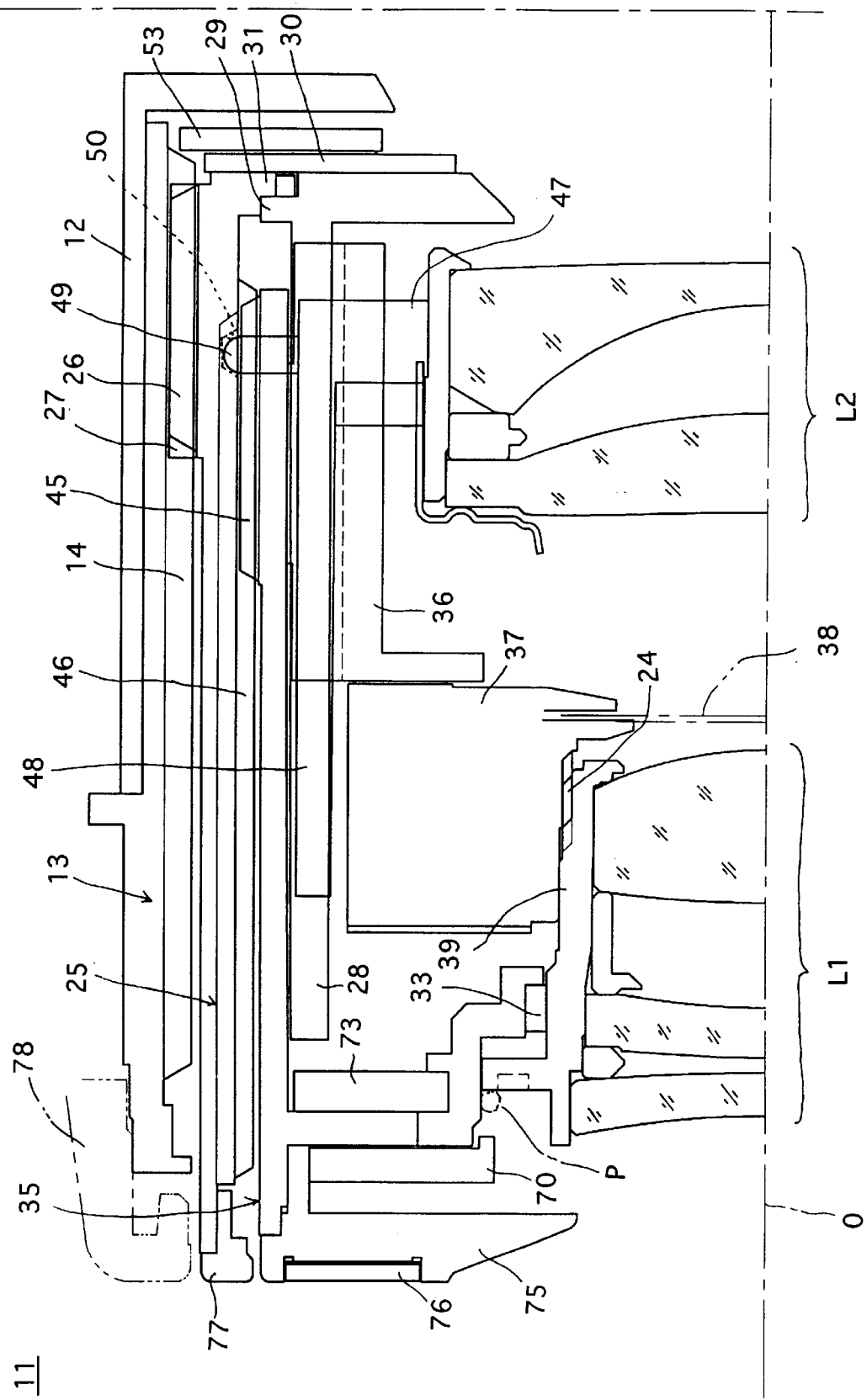
FIG. 6 is a sectional view of an upper half of a zoom lens barrel shown in FIG. 1, in an accommodated position.
Figure 7:
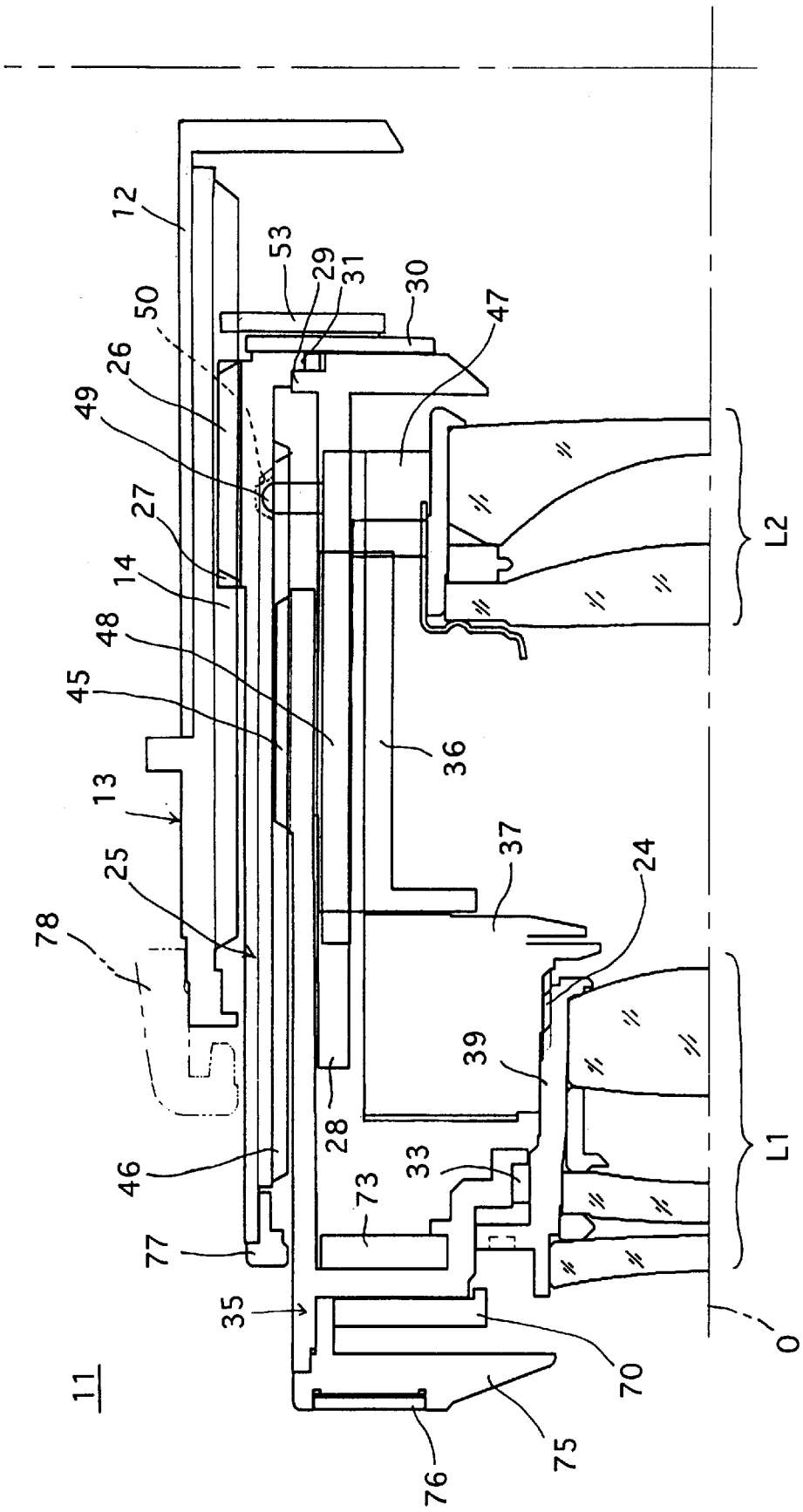
FIG. 7 is a sectional view of an upper half of a zoom lens barrel shown in FIG. 1, in a wide angle position.
Figure 8:
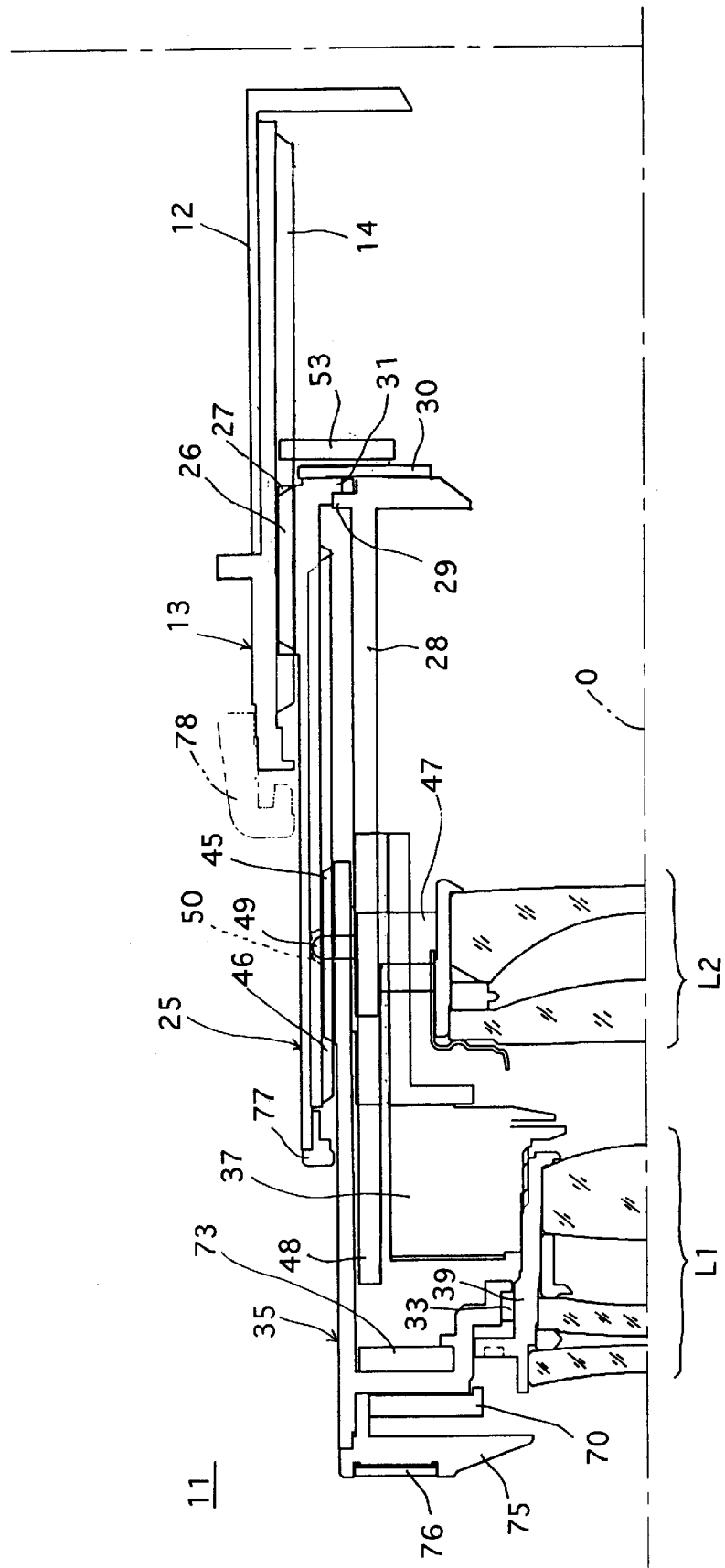
FIG. 8 is a sectional view of an upper half of a zoom lens barrel shown in FIG. 1, in a telephoto position.

The shutter block 37 supports a first lens group L1 (focusing lens group which serves as a power varying lens group) via a first lens frame 39. The first lens frame 39 and the shutter block 37 are provided on the outer peripheral surface and the inner peripheral surface, respectively, with inter-engageable adjustment threads 24, so that the first lens frame 39 can be adjusted in its axial position with respect to the shutter block 37 and the lens support barrel 35, via the adjustment threads 24. During the adjustment of the axial position of the first lens frame 39, it is possible to stably hold the position of the first lens frame 39 with a friction member 33 provided between the first lens frame 39 and the lens support barrel 35. When the position of the first lens frame 39 is determined, the first lens frame is adhered to the lens support barrel 35, for example, by an adhesive P (FIG. 6). Therefore, once the lens barrel is assembled, the first lens group L1 is secured to the lens support barrel 35 to move together therewith in the optical axis direction.

Figure 4:
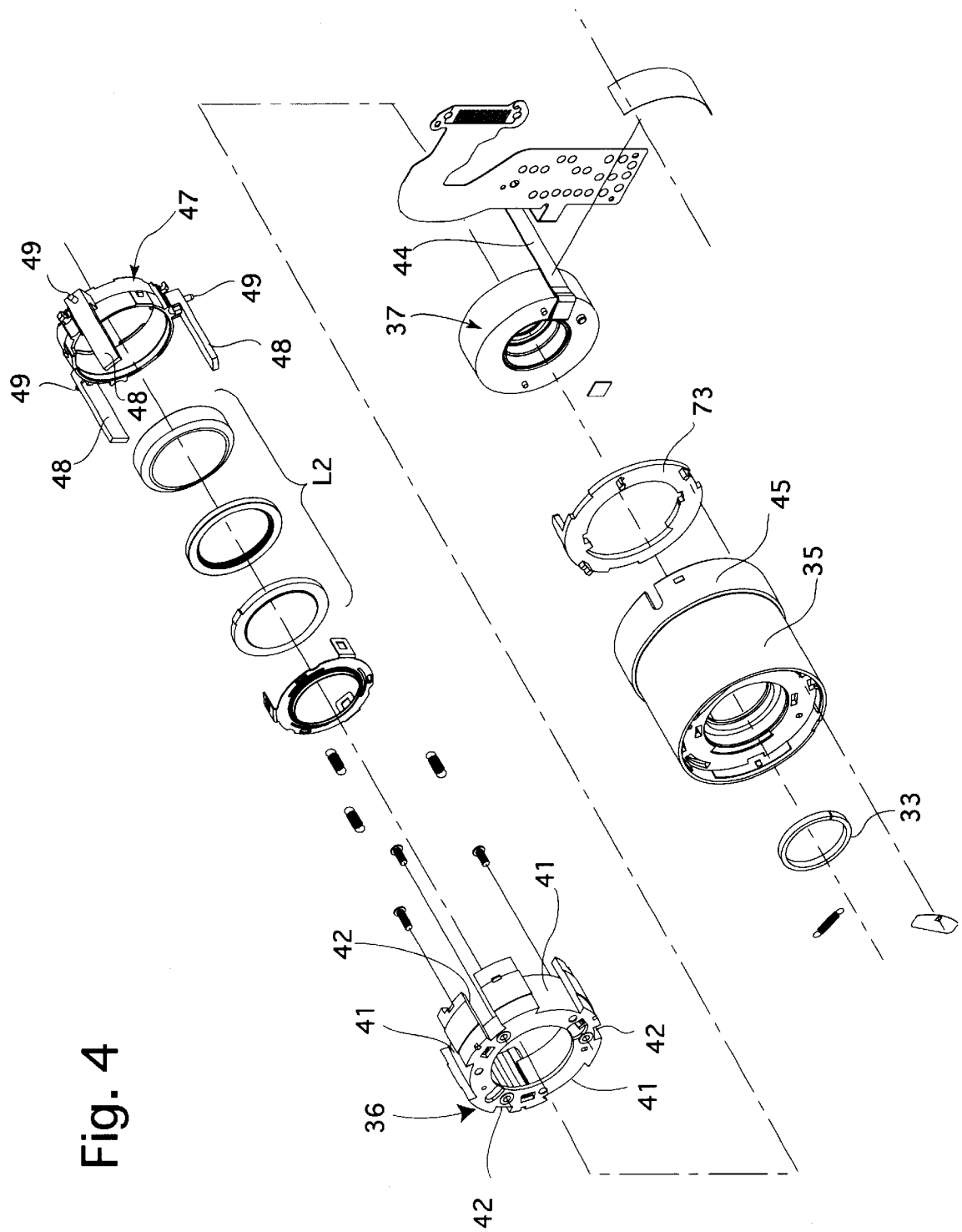
FIG. 4 is an enlarged exploded perspective view of a portion of a zoom lens barrel shown in FIG. 1.

As can be seen in FIGS. 1 and 3, the linear movement guide ring 28 has three split and spaced cylindrical segments (linear movement guide portions) 40 arranged on an imaginary cylinder. As can be seen in FIGS. 1 and 4, the shutter mount ring 36 secured to the lens support barrel 35 is provided with three first and second linear movement guide grooves 41 and 42 that are alternately arranged in the circumferential direction and extend in parallel with the optical axis O. The three linear movement guide portions 40 of the linear movement guide ring 28 are respectively fitted in the first linear movement guide grooves 41. The shutter mount ring 36, the lens support barrel 35 and the shutter block 37 are guided to move linearly in the optical axis direction due to the engagement between the linear movement guide grooves 41 and the linear movement guide portions 40.

The lens support barrel 35 is provided, on its outer peripheral surface in the vicinity of the rear end, with a male helicoid 45 which is engaged with a female helicoid 46 formed on the inner peripheral surface of the cam ring 25. When the cam ring 25 rotates, the lens support barrel 35 which is guided to move linearly via the linear movement guide ring 28 is reciprocally moved in the optical axis direction relative to the cam ring 25 (first feed portion), due to the screw-engagement between the female and male helicoids 46 and 45. Namely, the lens support barrel 35 constitutes a second feed portion of the zoom lens barrel 11. The first lens group L1 is moved in the optical axis direction together with the lens support barrel 35.

Three linear movement guide portions 48 provided on a second lens frame 47 which holds the second lens group (cam-guided lens group) L2 are fitted in the second linear movement guide grooves 42 of the shutter mount ring 36 to move in the optical axis direction. The second lens frame 47 is moved linearly due to the engagement between the linear movement guide portions 48 and the second linear movement guide grooves 42. The linear movement guide portions 48 of the second lens frame 47 are each provided with a radially and outwardly extending cam roller 49 which is fitted in a second lens guide cam groove 50 formed on the inner peripheral surface of the cam ring 25. The second lens guide cam grooves 50 are tapered with respect to the optical axis O, so that when the rotation of the cam ring 25 takes place, the second lens frame 47 which is guided to move linearly is moved reciprocally in the optical axis direction relative to the lens support barrel 35, due to the relationship between the second lens guide cam grooves 50 and the cam rollers 49. Namely, when the cam ring 25 rotates, the second lens group L2 is moved relative to the first lens group L1 in the optical axis direction, in accordance with the profile of the second lens guide cam grooves 50.

In a step zoom lens camera according to the present invention, the focal length from the telephoto extremity to the wide angle extremity is split into a finite number of focal length steps, so that the rotation of the cam ring 25 is controlled at each focal length step so as to focus on an object of any distance from the infinite distance (∞) to the shortest object distance (close-up), while performing the focusing operation followed by the zooming operation. The first lens group L1 is moved in the optical axis direction along a linear path, in accordance with the rotation angle (angular displacement) of the cam ring 25, through the male and female helicoids 45 and 46. The second lens group L2 is guided by the second lens guide cam groove 50, so that the relative distance of the second lens group L2 to the first lens group L1 is varied in each focal length step to vary the focal position.

The focal length steps from the wide angle extremity to the telephoto extremity and the retracted position (accommodation position) of the lens barrel can be detected in accordance with a change in the slide contact position of a code plate 51 secured to the inner surface of the stationary barrel 13 with a brush 52 secured to the linear movement guide plate 30 which is a component of the first feed portion, as finite stages of focal length data. The code plate 51 is connected to the CPU 60 through lead wires 55, so that when the slide contact position of the code plate 51 with the brush 52 is varied in accordance with the axial displacement of the linear movement guide plate 30 (first feed portion) relative to the stationary barrel 13, the focal length (step) can be detected. The brush 52 is secured to the linear movement guide plate 30 by a brush retainer 53 and a securing screw 54.

Figure 9:
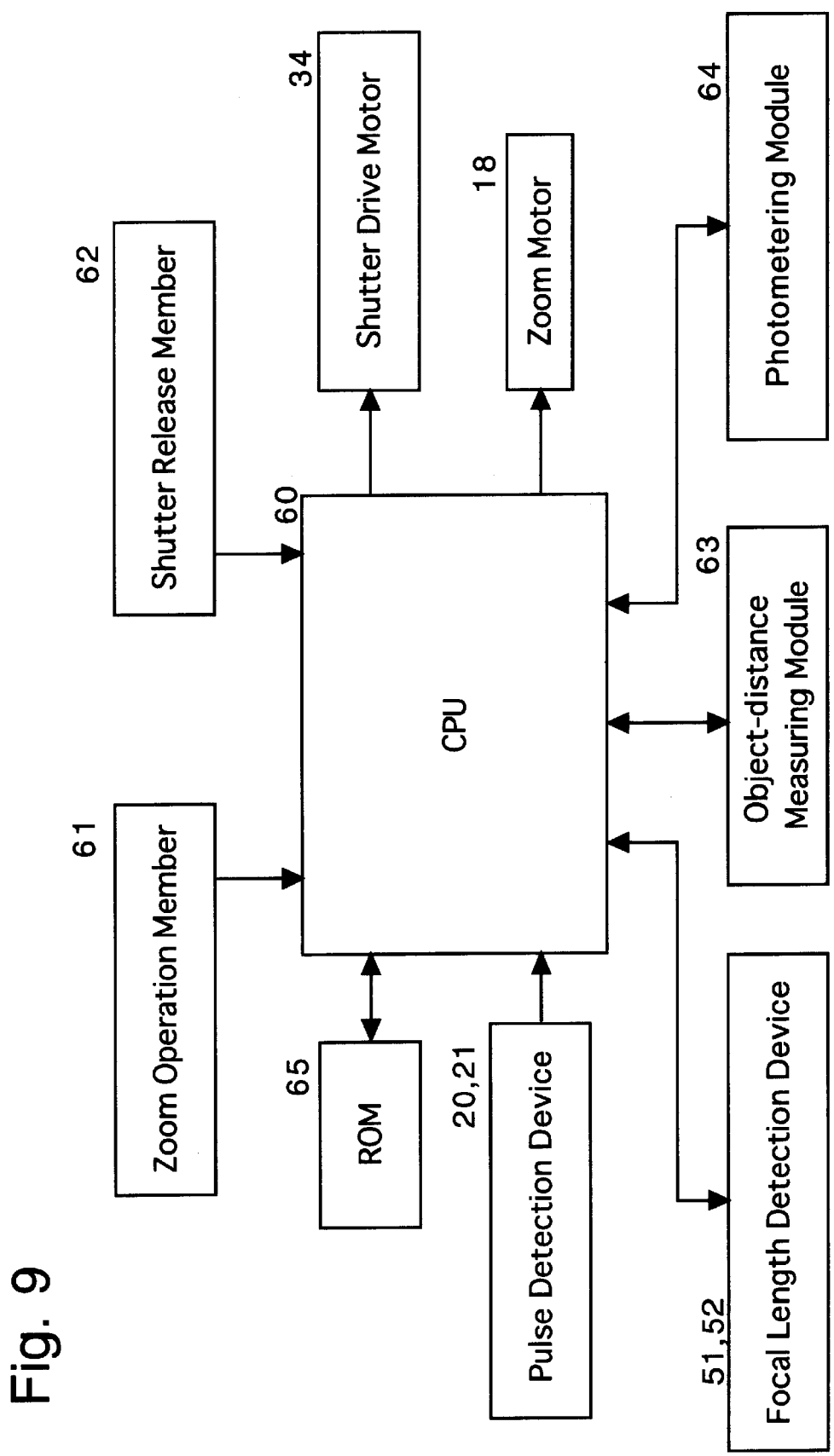
FIG. 9 is a block diagram of a control circuit system of a step zoom lens camera whose mechanical structure is shown in FIGS. 1 through 8.

As can be seen in FIG. 9, the zoom lens camera 10 includes a zoom operation member 61, a shutter releasing member 62, an object distance measuring module 63 and a photometering module 64. These elements are connected to the CPU 60. The zoom operation member 61 is actuated to supply a zooming command signal to move the zoom lens barrel 11 from the wide angle side to the telephoto side or from the telephoto side to the wide angle side. The shutter releasing member 62 includes a release button which supplies a distance measuring command signal to the object distance measuring module 63 and a photometering command signal to the photometering module 64 when the release button is depressed by half step and actuates the shutter drive motor 34 of the shutter block 37 when the release button is depressed by full step. The shutter drive motor 34 opens the shutter blades 38 for a predetermined time in response to the brightness output from the photometering module 64. The ROM (EEPROM) 65 is connected to the CPU 60.

The ROM 65 has arithmetic formulae stored therein to calculate the angular displacement (number of pulses) of the cam ring 25 necessary to move the zoom lens system to the focal position between the infinite distance (∞) to the closest object distance (close-up).

Figure 5:
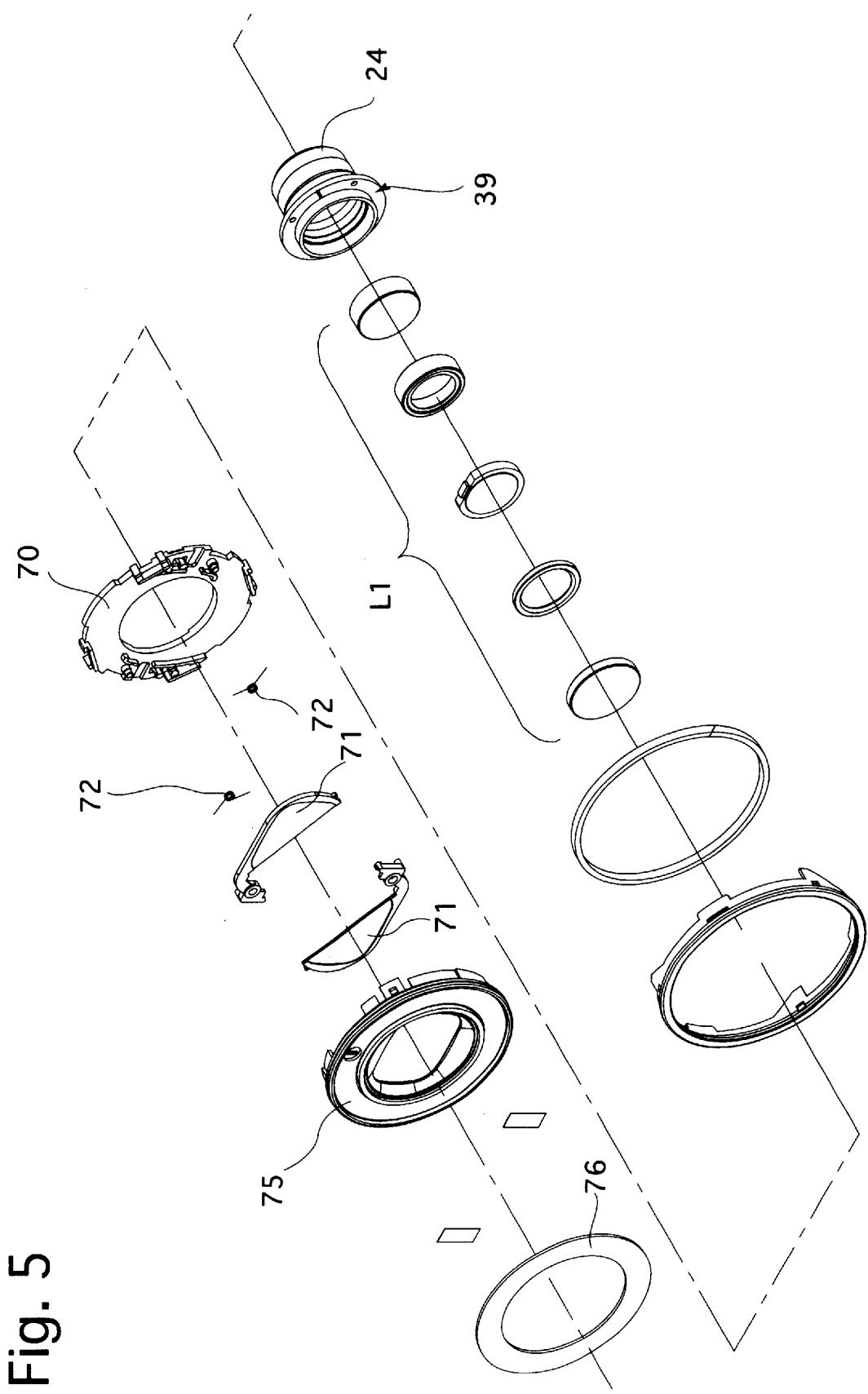
FIG. 5 is an enlarged exploded perspective view of a portion of a zoom lens barrel shown in FIG. 1.

An opening and closing barrier mechanism which closes and opens the front opening of the first lens group L1 at the retracted position of the lens barrel and at the photographing position is provided at the front end of the zoom lens barrel 11. As shown in FIGS. 1 and 5, the opening and closing barrier mechanism is constructed from a pair of barrier blades 71 supported by the barrier mount 70 provided in the vicinity of the front end of the lens support barrel 35, barrier biasing springs 72 which bias the barrier blades 71 in the closed position, and a barrier drive ring 73. The barrier drive ring 73 rotates in accordance with the axial movement of the lens support barrel 35 of the zoom lens barrel 11 to thereby open or close the barrier blades 71.

A decorative plate 75 is provided in front of the lens support barrel 35 to cover the front portion of the opening and closing barrier mechanism. The decorative plate 75 is covered at the front surface thereof by a decorative ring 76. Another decorative ring 77 is attached to the front end of the cam ring 25. Moreover, the front end of the stationary barrel 13 is covered by a front cover 78 which is a component of the camera body (see FIG. 6).

The zoom lens system of the step zoom lens camera operates as follows. When the zoom motor 18 is driven in the barrel feed direction from the retracted position shown in FIG. 6 or the wide angle extremity shown in FIG. 7, the cam ring 25 is rotated and moved forward from the stationary barrel 13, so that the linear movement guide ring 28 is moved forward together with the cam ring 25 while being guided by the stationary barrel 13 to move linearly. When the cam ring 25 is rotated and moved forward, the lens support barrel 35, which is screw-engaged by the inner surface of the cam ring 25 via the helicoids 45 and 46, respectively, and is guided to move linearly is moved forward together with the first lens group L1 in the axial direction. At the same time, the second lens group L2 which is guided by the second lens guide cam grooves 50 is moved in the lens support barrel 35 along a path different from that of the first lens group L1. Consequently, the first and second lens groups L1 and L2 are moved in the optical axis direction while varying the distance therebetween to carry out the zooming operation. When the zoom motor 18 is driven in the retraction direction from the telephoto extremity shown in FIG. 8, the zoom lens barrel 11 and the lens groups L1, L2 are moved in a direction opposite to the direction when the lens barrel is moved forward.

The focusing operation at each focal length step is controlled as follows. When the zoom operation member 61 is operated to carry out the barrel feed or retraction operation mentioned above, the code plate 51 and the brush 52 are brought into slide contact with each other to detect any one of the focal length steps. In the illustrated embodiment, the step detection position is located at a predetermined position on the retraction side (wide angle side) at each focal length step, so that a pulse counting reference position upon focusing is located slightly before the step detection position. Since the camera to which the present invention is applied is provided with a finder optical system (not shown) separate from the photographing optical system, focusing is not necessary upon a zooming operation. Therefore, when the zooming operation is released, the zoom lens barrel 11 is stopped at a stand-by position located in rear of the pulse counting reference position at each focal length step in the barrel retraction direction.

If the release button is depressed by half step to perform the object distance measuring operation using the distance measuring module 63, the CPU 60 detects the object distance. Consequently, the angular displacement of the cam ring 25 to move the zoom lens system to a focal position of the object is calculated in accordance with an arithmetic formulae stored in the ROM by the CPU 60. The angular displacement of the cam ring 25 thus obtained is compared with the angular displacement of the cam ring 25 at the pulse counting reference position. Consequently, the number of the drive pulses of the zoom motor 18 necessary to move from the reference position of the cam ring 25 to the angular position thereof corresponding to the focal position is determined.

If the release button is fully depressed, so that the ON signal is input from the shutter release member 62, the zoom motor 18 is driven to move the zoom lens barrel 11 in the feed direction (forward direction). Consequently, the number of pulses of the zoom motor 18 from the contact position of the brush 52 and the code plate 51, i.e., from the pulse counting reference position, is counted. The counting operation of the pulses is carried out using the slit disc 20b and the photo-interrupter 21. When the number of pulses previously obtained by calculation is detected, the zoom motor 18 is stopped to hold the zoom lens system in an in-focus position, and the shutter blades 38 are opened and closed by the shutter drive motor 34 to thereby take a picture. When the photographing operation is completed, the zoom lens barrel 11 is returned to the stand-by position for each focal length step. Note that although the focusing operation is carried out upon a shutter release operation in the illustrated embodiment, the mode of the focusing operation is not limited thereto. For example, it is possible to carry out the focusing operation when the object distance measurement is completed. Moreover, the stand-by position of the zoom lens barrel at each focal length step can be different from the stand-by position mentioned above.

As mentioned above, in the zoom lens camera according to the embodiment of the invention, the first and second lens groups L1 and L2 are moved to carry out the focusing operation which is followed by the zooming operation, at each focal length step. The focusing operation is carried out by the rotation of the cam ring 25. More specifically, the first lens group L1 secured to the lens support barrel 35 is moved to linearly increase or decrease the distance from the film surface (image pickup surface) in the zooming area from the wide angle extremity closest to the film surface to the telephoto extremity farthest from the film surface when the cam ring 25 is rotated. The second lens group L2 is moved along a non-linear path different from an imaginary linear zooming path (a path along which the second lens group is moved together with the first lens group to continuously vary the focal length without varying the focal position).

Figure 10:
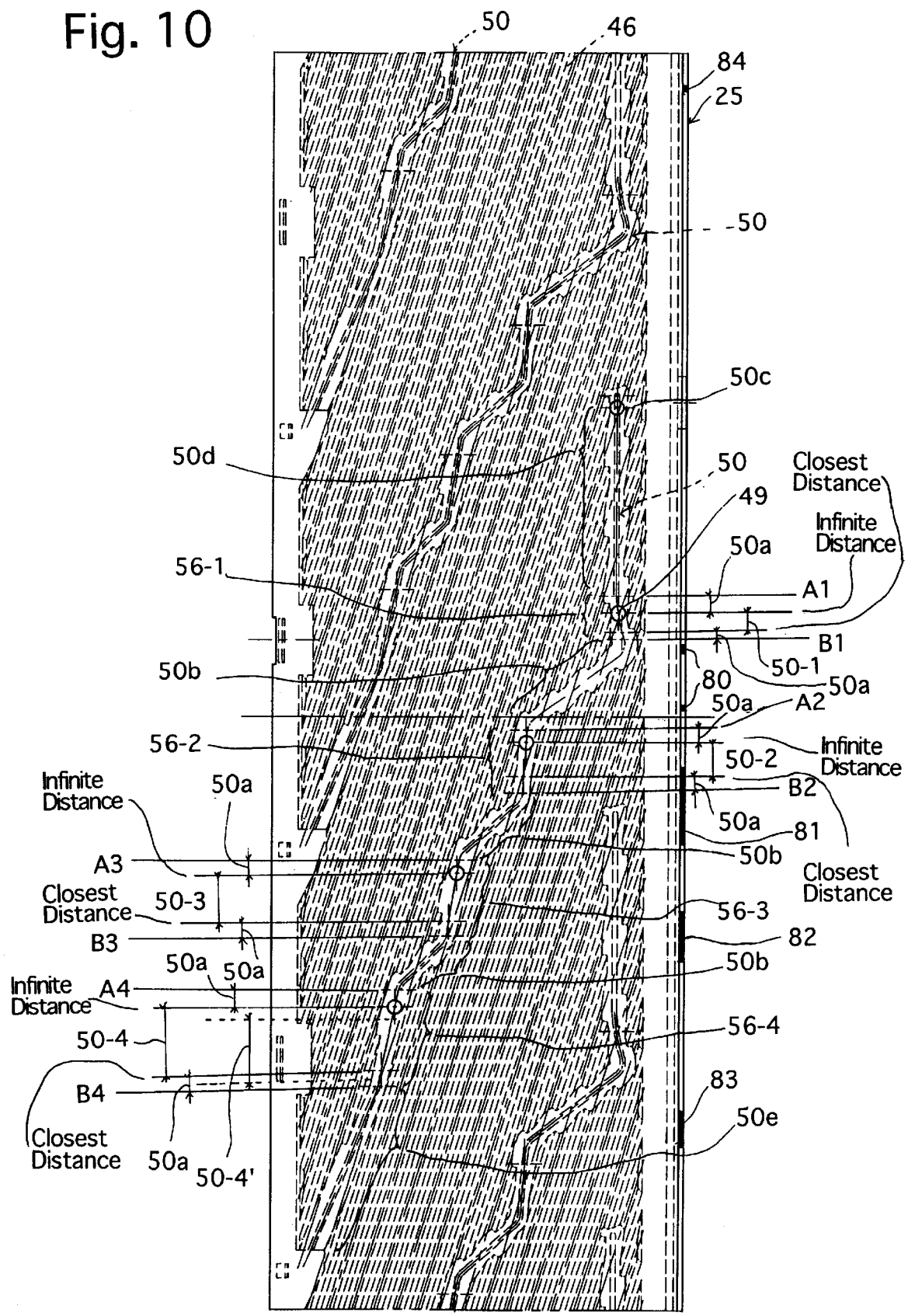
FIG. 10 is a developed view of a cam ring.

Namely, as shown in FIG. 10, the second lens guide cam groove 50 by which the second lens group L2 is guided is provided with a non-linear path which is split into four steps in the zooming area from the wide angle extremity to the telephoto extremity. The split steps of the groove of the second lens guide cam groove 50 are referred to as step grooves 50-i (i=1 to 4) from the wide angle side. The step grooves 50-i provide a path which enables the second lens group L2 to move to a focal position of each object between the infinite distance and the shortest distance and is displaced from the above-mentioned imaginary zooming path.

Each step groove 50-i is provided on its opposed ends with adjustment areas 50a. The stop position of the cam ring 25 is predetermined so as to be within the step groove 50-i in accordance with the object distance. However, in a step zoom lens camera, the zoom adjustment (i.e., an adjustment to make the focal position at each focal length identical to each other) or the backfocus adjustment (i.e., an adjustment to make the focal position coincident with the image pickup surface or film surface) can be carried out by setting (correcting) the rotation of the cam ring upon releasing the shutter. For instance, in a zoom lens system of the illustrated embodiment, it is alternatively possible to carry out zooming by adjusting the axial position of the first lens group L1 relative to the lens support barrel 35, and to carry out the backfocus adjustment by varying the angular displacement of the cam ring 25. In this alternative, the second lens group L2 must be moved by rotating the cam ring 25, during the shutter release operation, in accordance with the backfocus adjustment factors regardless of the object distance (or in combination with the object distance). To this end, the adjustment areas 50a ensure the displacement of the second lens group L2 in accordance with backfocus adjustment factors. Alternatively, it is possible to carry out both the zooming adjustment and the backfocus adjustment by setting (correcting) the angular displacement of the cam ring during a shutter release operation. In this alternative, the second lens group L2 is moved by rotating the cam ring 25, upon the shutter release operation, in accordance with zoom adjustment factors and backfocus adjustment factors regardless of the object distance (or in combination with the object distance). In this case, the adjustment areas 50a ensure the displacement of the second lens group L2 in accordance with the zoom adjustment factors and the backfocus adjustment factors.

Namely, if the ends of each step groove 50-i are moved within the adjustment areas 50a, the focusing operations within each step groove 50-i can be equally carried out. With reference to FIG. 10, if the basic step groove 50-4 (i=4) is moved to the step groove 50-4', using the adjustment area 50a, the focusing operation can be equally performed. Namely, in the second lens guide cam groove 50, the opposed adjustment areas 50a on opposite sides of each predetermined step groove 50-i form the effective cam groove area (step area) 56-i (i=1 to 4) used in each focal length step.

There are also transfer areas (transit areas) 50b provided between adjacent effective cam groove areas 56-1, 56-2, 56-3 and 56-4. The transfer areas 50b connect the adjacent effective cam groove areas 56-i and function to bring the effective cam groove areas 56-i as close as possible to the imaginary zooming path. The second lens guide cam groove 50 has an accommodation area 50c which receives and guides therein the cam roller 49 when the lens barrel is retracted. There is also a transfer area (transit area) 50d between the accommodation area 50c and the effective cam groove area 56-1 for the wide angle step. An introduction portion 50e is formed in front of the effective cam groove area 56-4 including the step groove 50-4 to introduce the cam roller 49 into the second lens guide cam groove 50.

Namely, at each of the four steps from the wide angle extremity to the telephoto extremity, if the focusing operation (including the focus adjustment) is carried out for all the areas from the infinite distance to the shortest distance, the cam ring 25 is located at an appropriate angular position as long as the cam roller 49 is moved within the effective cam groove area 56-i. Conversely, at each focal length step, if the cam roller 49 is moved out of the effective cam groove area 56-i and enters the transfer area 50b or 50d or the introduction portion 50e, the object is out of focus. In the step zoom lens camera according to the present invention, the angular position of the cam ring 25 at each focal length step, i.e., the state of use of the second lens guide cam groove 50 can be easily confirmed with the mechanism described below without disassembling the lens barrel.

Figure 11:
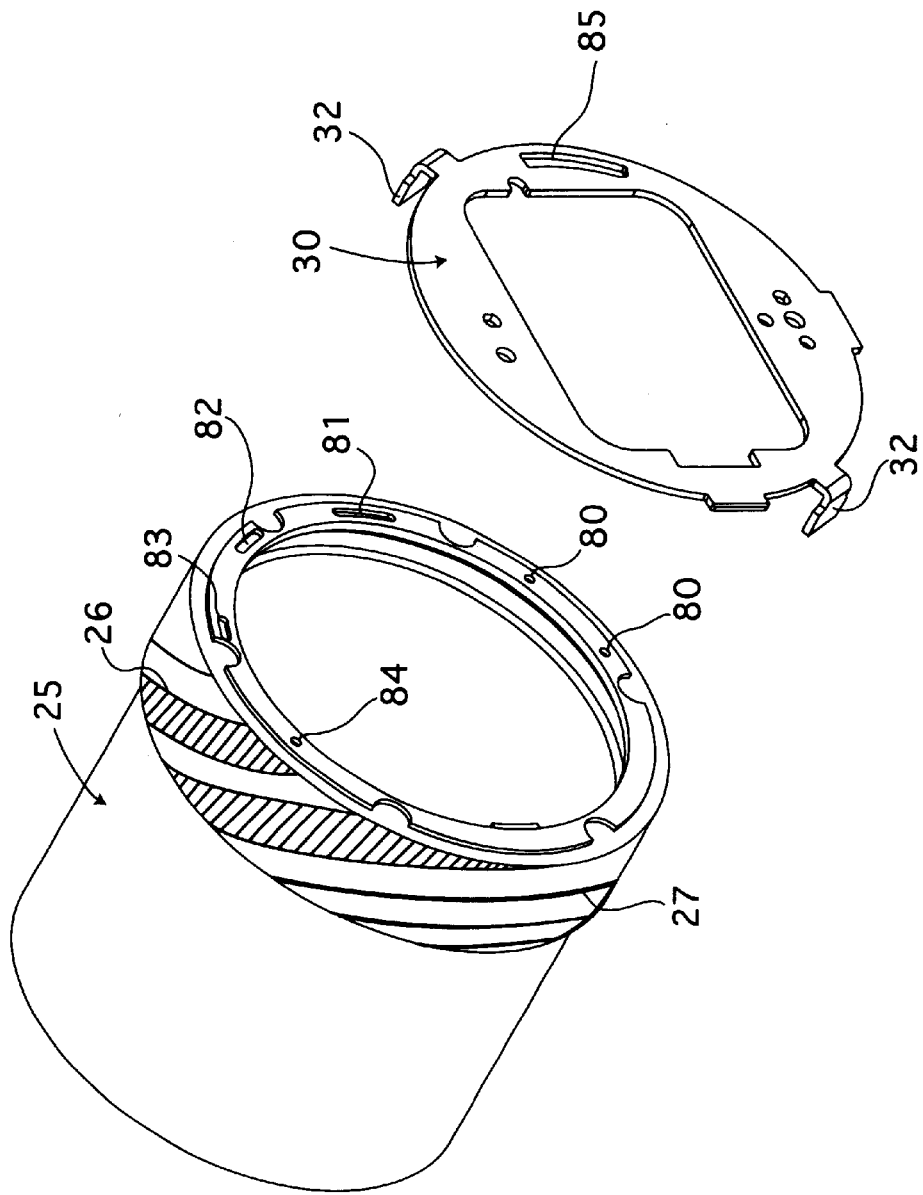
FIG. 11 is a rear perspective view of a cam ring and a linear movement guide plate in a disassembled state.
Figure 12:
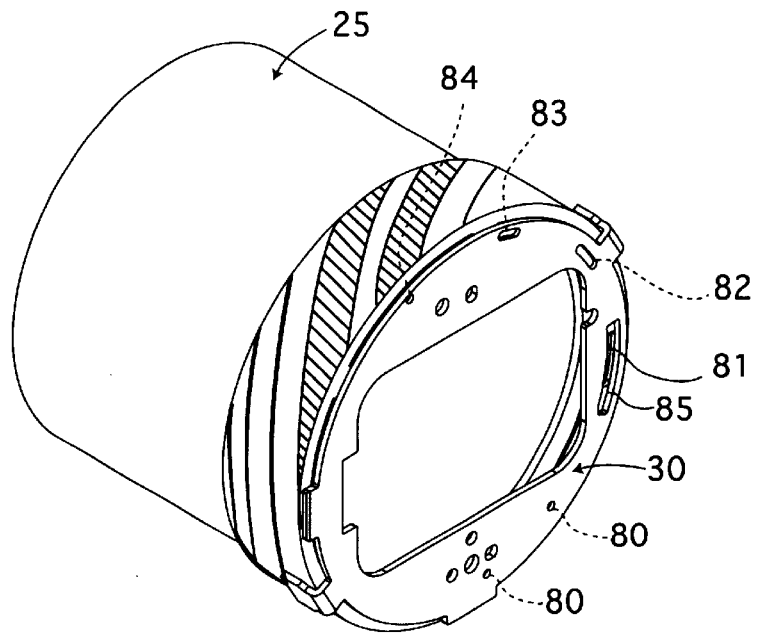
FIG. 12 is a rear perspective view of a cam ring and a linear movement guide plate in an assembled state.
Figure 13:
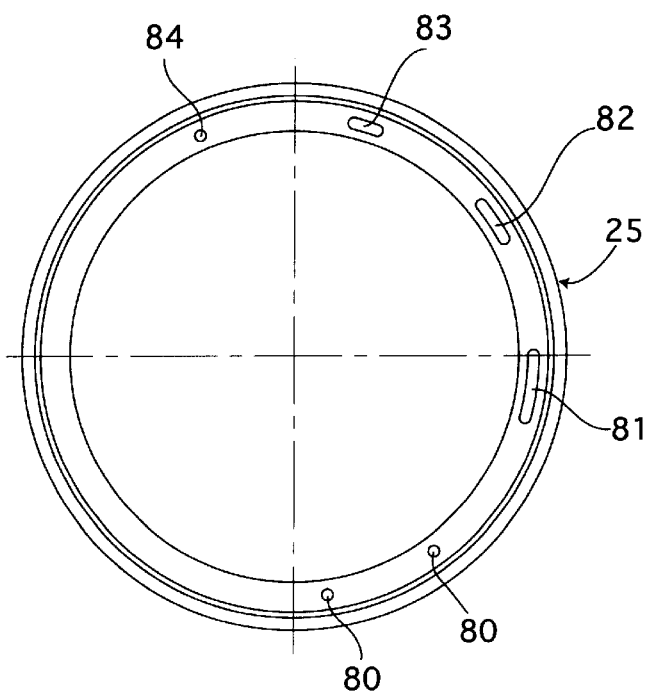
FIG. 13 is a rear end view of a cam ring.

As shown in FIGS. 11 through 13, the cam ring 25 is provided on its rear surface with accommodation area indication index 80, a wide angle extremity step index 81, a second step index 82, a third step index 83, and a telephoto extremity step index 84. The indexes 80 through 83 are spaced in the circumferential direction and are in the form of recesses formed on the rear surface of the cam ring 25. The linear movement guide plate 30 which covers the rear surface of the cam ring 25 is provided with an index viewing through window (reference index) 85 corresponding to the indexes. The view window 85 is elongated in the circumferential direction along an arc about the optical axis O. Consequently, when the linear movement guide plate 30 is connected to the cam ring 25 so as to rotate relative thereto (together with the linear movement guide ring 28), the indexes 80 through 84 can be viewed through the index view window 85 from the rear end side of the zoom lens barrel 11. Note that the indexes 80 through 84 shown in FIG. 10 are blacked out for clarity.

Figure 14:
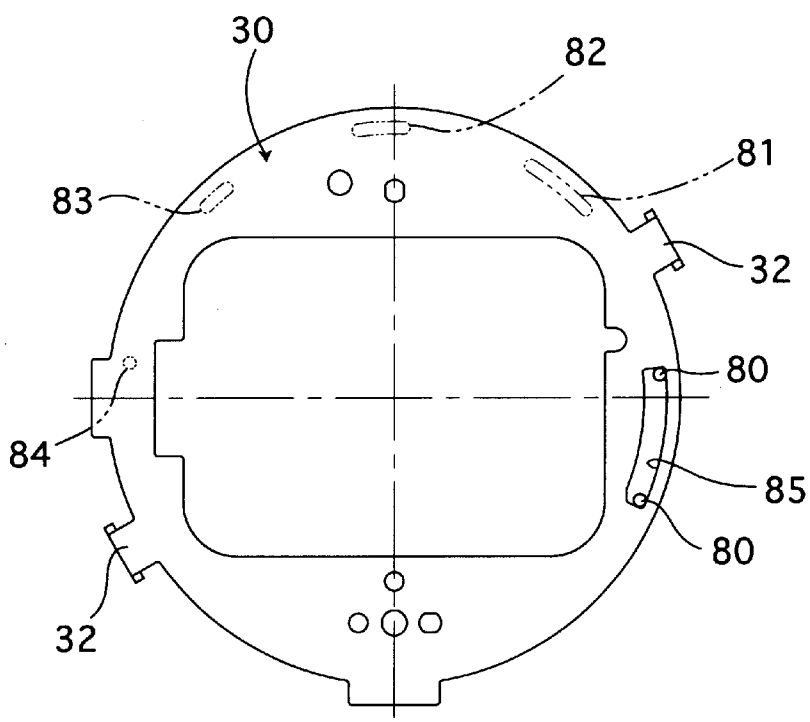
FIG. 14 is a rear end view of a cam ring and a linear movement guide plate, showing a relative angular position therebetween, in an accommodated position of a zoom lens.
Figure 23:
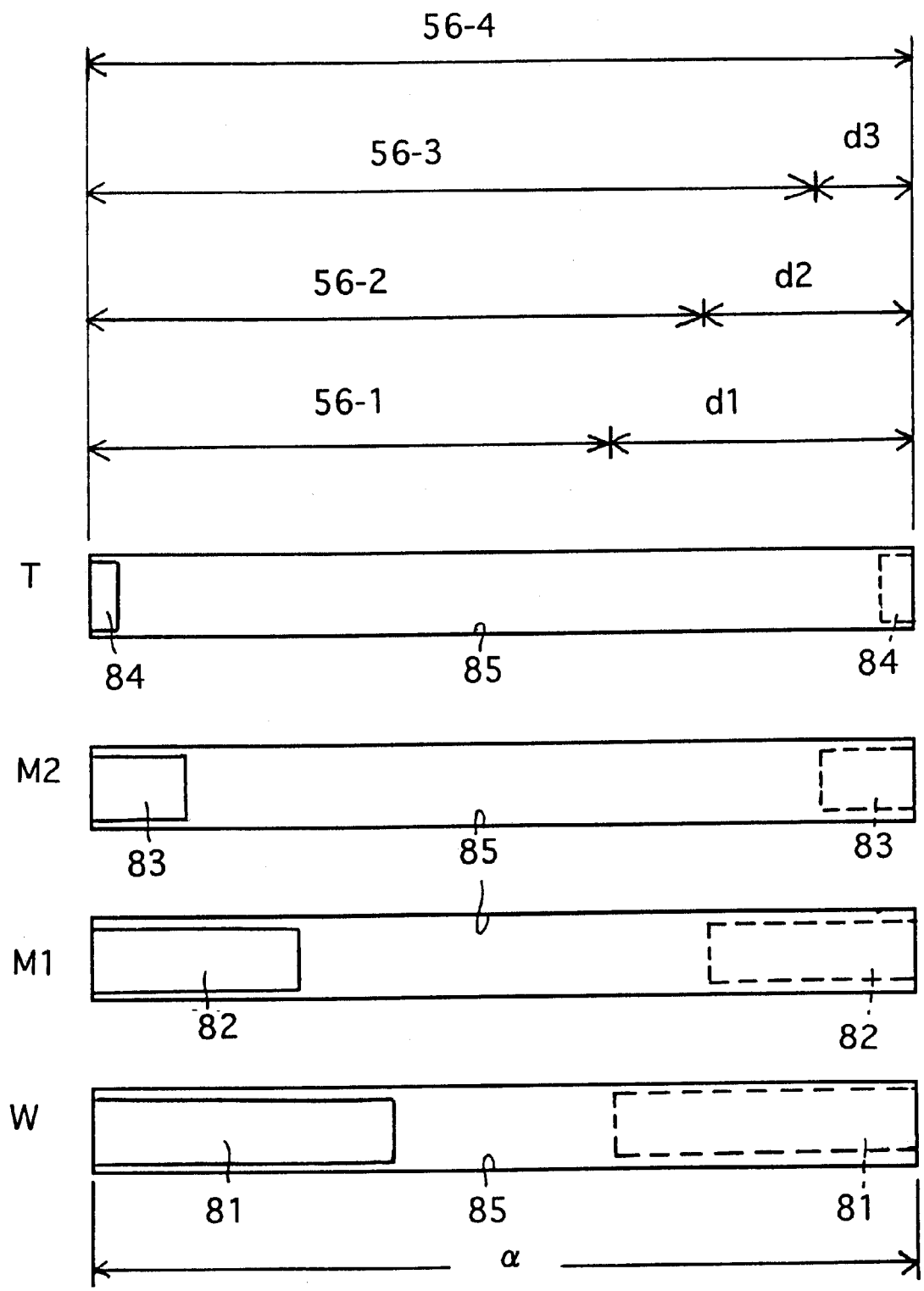
FIG. 23 is a linearly developed view showing a relationship among an effective cam groove area, an indicia viewing window, and each focal length step indicia.

The relationship between the index view window 85 and the indexes 80 through 84 will be explained below with reference to FIG. 23. FIG. 23 shows a linearly developed view of the elements arranged in the radial direction. The circumferential length a of the index view window 85 corresponds to the rotation angle of the effective cam groove area 56-4 on the telephoto side, which is longest among the four steps of effective cam groove areas 56-i so as to confirm the indexes of all the step areas. The circumferential length α of each of the indexes 81 through 84 which represents the step area corresponds to the difference d (d1 through d3) which is obtained by subtracting the rotation angle of the corresponding effective cam groove area 56-i from the longest effective cam groove area 56-4. Namely, the circumferential length of the wide angle step index 81 which represents the wide angle step corresponds to the difference d1 which is obtained by subtracting the rotation angle of the effective cam groove area 56-1 of the wide angle extremity step from the effective cam groove area 56-4. Likewise, the circumferential length of the second step index 82 is determined by the difference d2, i.e., the effective cam groove area 56-4 minus the effective cam groove area 56-2, and the circumferential length of the third step index 83 is determined by the difference d3, i.e., the effective cam groove area 56-4 minus the effective cam groove area 56-3. For the telephoto extremity step index 84, the difference is zero and, hence, the index 84 is in the form of a minimum-sized circle necessary to view the index, unlike the remaining indexes 81 through 83 which are elongated in the circumferential direction (see FIGS. 11 through 13). The positional relationship between the index view window 85 and the indexes 81 through 84 when the cam ring 25 and the linear movement guide plate 30 are assembled is such that when the indexes 81 through 84 is viewed within the view window 85, the corresponding effective cam groove area 56-i is used. The two accommodation area indexes 80 which represent the accommodation position are spaced from one another by an angular distance corresponding to the rotation angle of the effective cam groove area 56-4 so that the indexes 80 are located at the opposed ends of the index view window 85 so as to identify the accommodation position (FIG. 14).

Consequently, when the cam ring 25 is normally rotated at each step area, it can be viewed that the corresponding indexes 81 through 84 are moved from one end of the index view window 85 to the other end thereof. For example, in FIG. 23, when the movement of the wide angle step index 81 from one end indicated by a solid line to the other end indicated by a phantom line within the index view window 85 occurs, the cam ring 25 is driven by a rotation angle of the wide angle step W, using the effective cam groove area 56-1. The same is true for the second and third steps M1 and M2 for the intermediate distance. Namely, when the movement of the indexes 82 and 83 from the position indicated by a solid line to the position indicated by a phantom line occurs within the index view window 85, the cam ring 25 is driven by a rotation angle corresponding to the effective cam groove areas 56-2 and 56-3. Furthermore, when the telephoto extremity step index 84 is moved from the position indicated by a solid line to the position indicated by a phantom line within the index view window 85, the cam ring 25 is driven by a rotation angle of the telephoto extremity step T, using the effective cam groove areas 56-1.

The indexes 81 through 83 include the areas corresponding to the differences d1 through d3, respectively, and hence, the indexes are elongated along an arc, in the illustrated embodiment. However, in theory, the indexes 81 through 83 can be shaped to have end portions only. However, if this shape is adopted, it is difficult to distinguish the indexes including the telephoto extremity step index 84 or the accommodation area indication index 80. Accordingly, it is preferable that the indexes, including those elongated in the circumferential direction, have different shapes, thus resulting in an enhancement of distinguishability of the indexes 80 through 84. Moreover, although the indexes 81 through 84 are rectangular in FIG. 23, for clarity, the shape of the indexes is preferably arch-shaped as shown in FIG. 13 or elliptical, so that the end portions of the indexes can be easily viewed. Alternatively, it is possible to shape the end portions of the index view window 85 so as to easily view the end portions of the indexes 81 through 84.

As mentioned above, the reason that the lengths of the indexes 81 through 84 in the circumferential direction are different is that the circumferential lengths of the effective cam groove areas 56-i (rotation angles of the cam ring 25) in the corresponding steps are different. For instance, in the illustrated embodiment, the rotation angle of the effective cam groove areas 56-i increases from the wide angle side in the order of the focal length, and accordingly, the wide angle step index 81 is longest and the length is decreased in the order of the second step index 82, the third step index 83 and the telephoto extremity step index 84. However, the rotation angles of the effective cam groove areas may not necessarily vary depending on the order of the focal length or may be identical, depending on the cam profile or on the setting of the adjusting areas. In this case, the circumferential length of the step indexes is not varied in accordance with the order of the focal length steps. Namely, the length of the step indexes (indication areas) can be set in accordance with the rotation angle of the corresponding effective cam groove areas.

FIGS. 14 through 22 show the actual indexes when viewed through the view window 85. FIG. 14 shows the cam ring 25 and the linear movement guide plate 30 viewed from the rear side when the zoom lens barrel 11 is in the retracted position (accommodation position). The pair of accommodation area indexes 80 formed on the cam ring 25 are located at the opposed ends of the index view window 85 formed in the linear movement guide plate 30.

Figure 15:
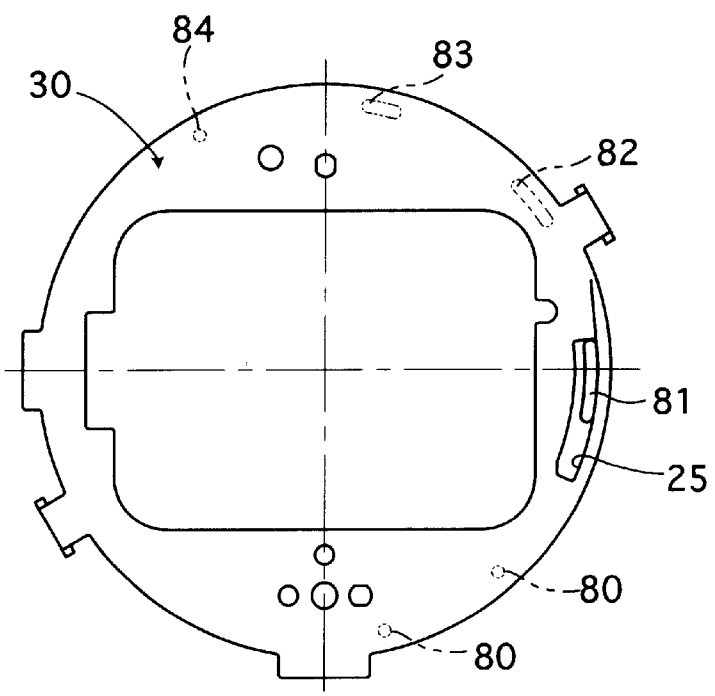
FIG. 15 is a rear end view of a cam ring and a linear movement guide plate, showing a relative angular position therebetween, at one end of the effective cam groove area in a wide angle step position of a zoom lens.
Figure 16:
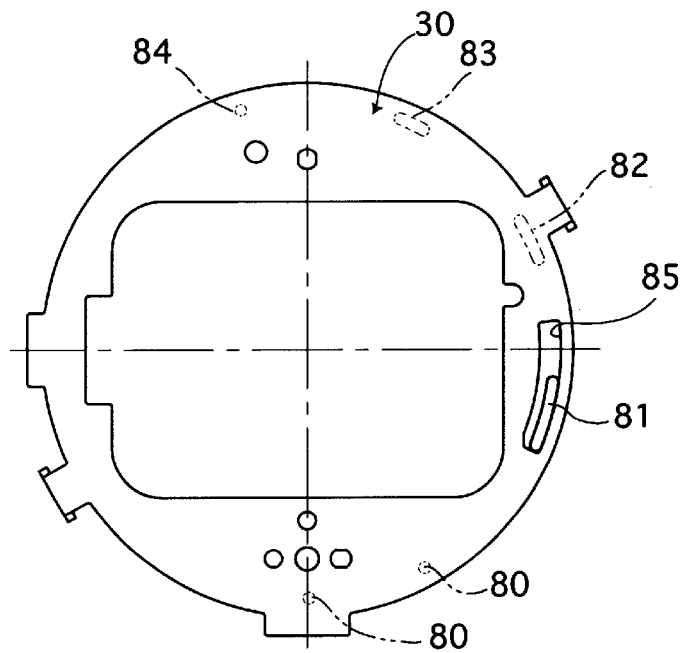
FIG. 16 is a rear end view of a cam ring and a linear movement guide plate, showing a relative angular position therebetween, at the other end of the effective cam groove area in a wide angle step position of a zoom lens.

FIGS. 15 and 16 show the cam ring 25 and the linear movement guide plate 30 viewed from the rear side when the zoom lens barrel 11 is located at the wide angle extremity. In FIG. 15, the lens barrel is moved forward from the accommodation position and firstly enters the effective cam groove area 56-1 of the wide angle extremity step. In this state, the cam roller 49 is located at the position A1 (see FIG. 10) of the second lens guide cam groove 50 cam. In FIG. 16, the lens barrel is moved forward to the position closest to the telephoto extremity in the effective cam groove area 56-1 in the wide extremity step. In this state, the cam roller 49 is located at the position B1 in the second lens guide cam groove 50. Namely, when the entirety of the wide angle step index 81 is viewed through the index view window 85, the cam roller 49 is located in the effective cam groove area 56-1 for the wide angle extremity step within the second lens guide cam groove 50.

Figure 17:
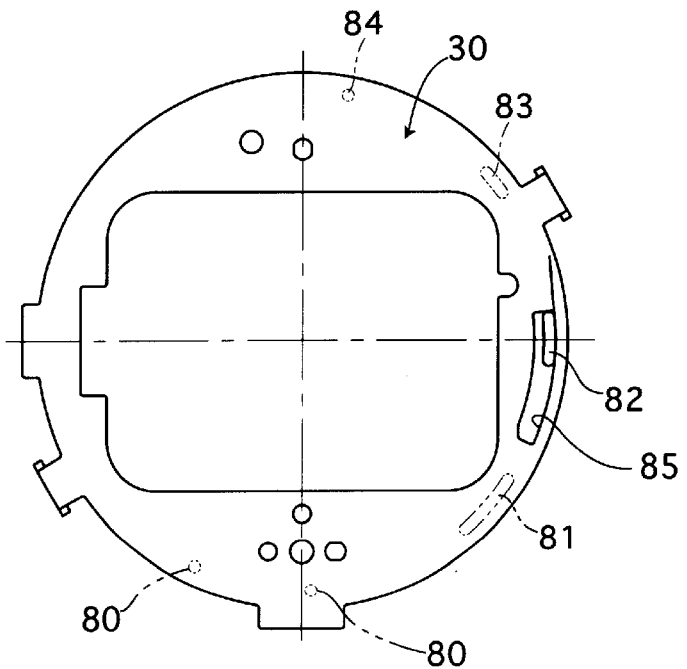
FIG. 17 is a rear end view of a cam ring and a linear movement guide plate, showing a relative angular position therebetween, at one end of the effective cam groove area, in a second step from the wide angle extremity of a zoom lens.
Figure 18:
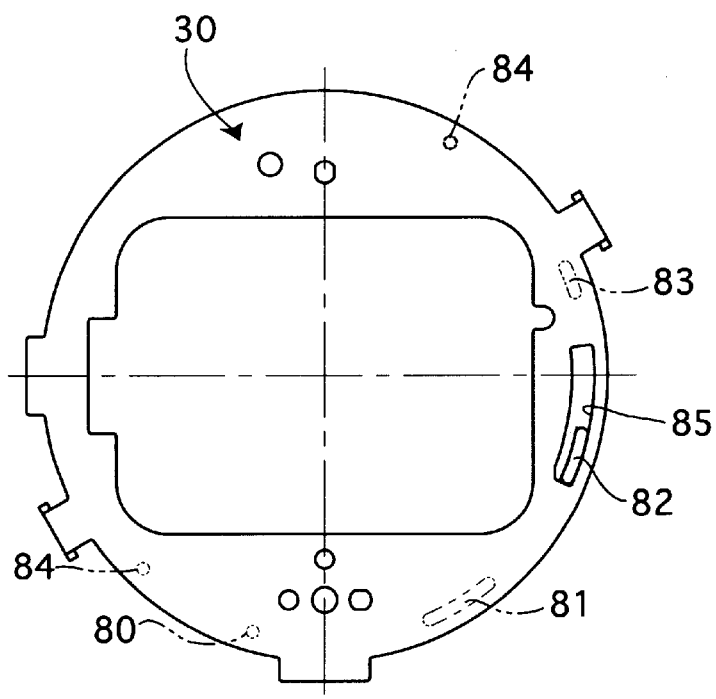
FIG. 18 is a rear end view of a cam ring and a linear movement guide plate, showing a relative angular position therebetween, at the other end of the effective cam groove area, in a second step from the wide angle extremity of a zoom lens.
Figure 19:
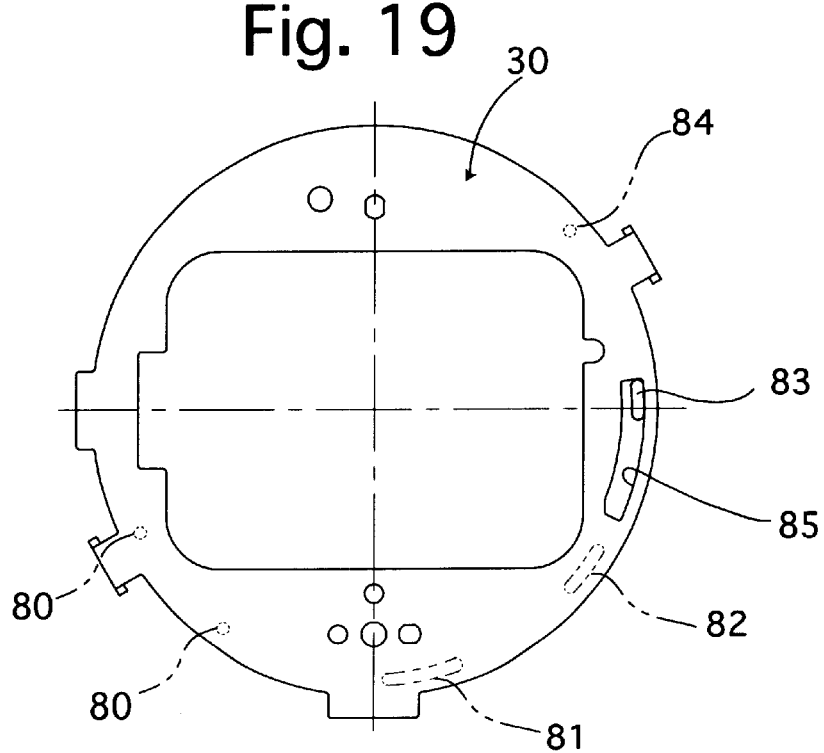
FIG. 19 is a rear end view of a cam ring and a linear movement guide plate, showing a relative angular position therebetween, at one end of the effective cam groove area, in a third step from the wide angle extremity of a zoom lens barrel.
Figure 20:
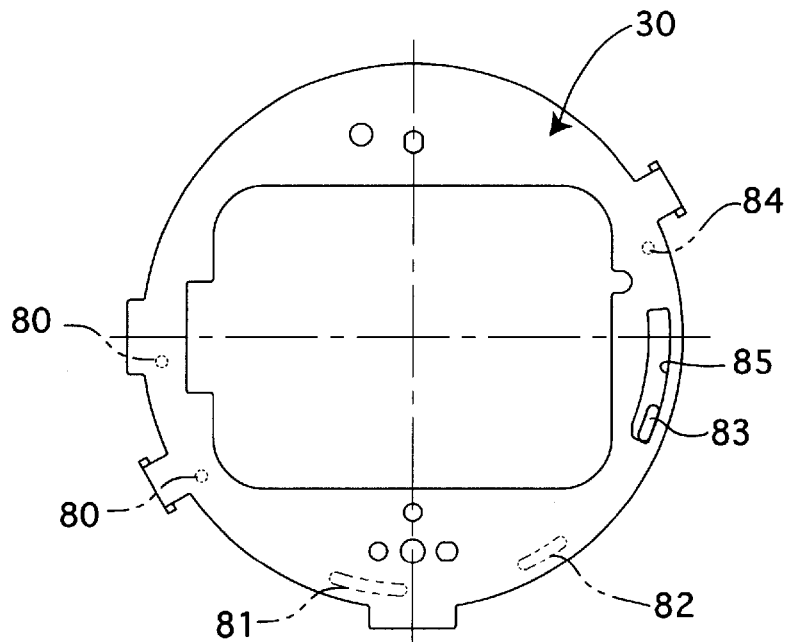
FIG. 20 is a rear end view of a cam ring and a linear movement guide plate, showing a relative angular position therebetween, at the other end of the effective cam groove area, in a third step from the wide angle extremity of a zoom lens barrel.
Figure 21:
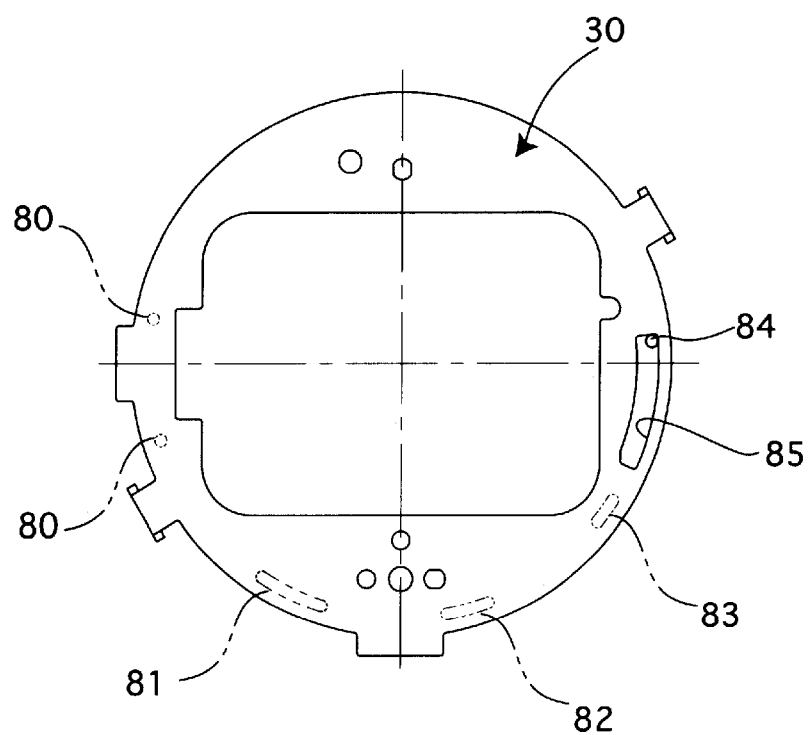
FIG. 21 is a rear end view of a cam ring and a linear movement guide plate, showing a relative angular position therebetween, at one end of the effective cam groove area, in a telephoto step position of a zoom lens barrel.
Figure 22:
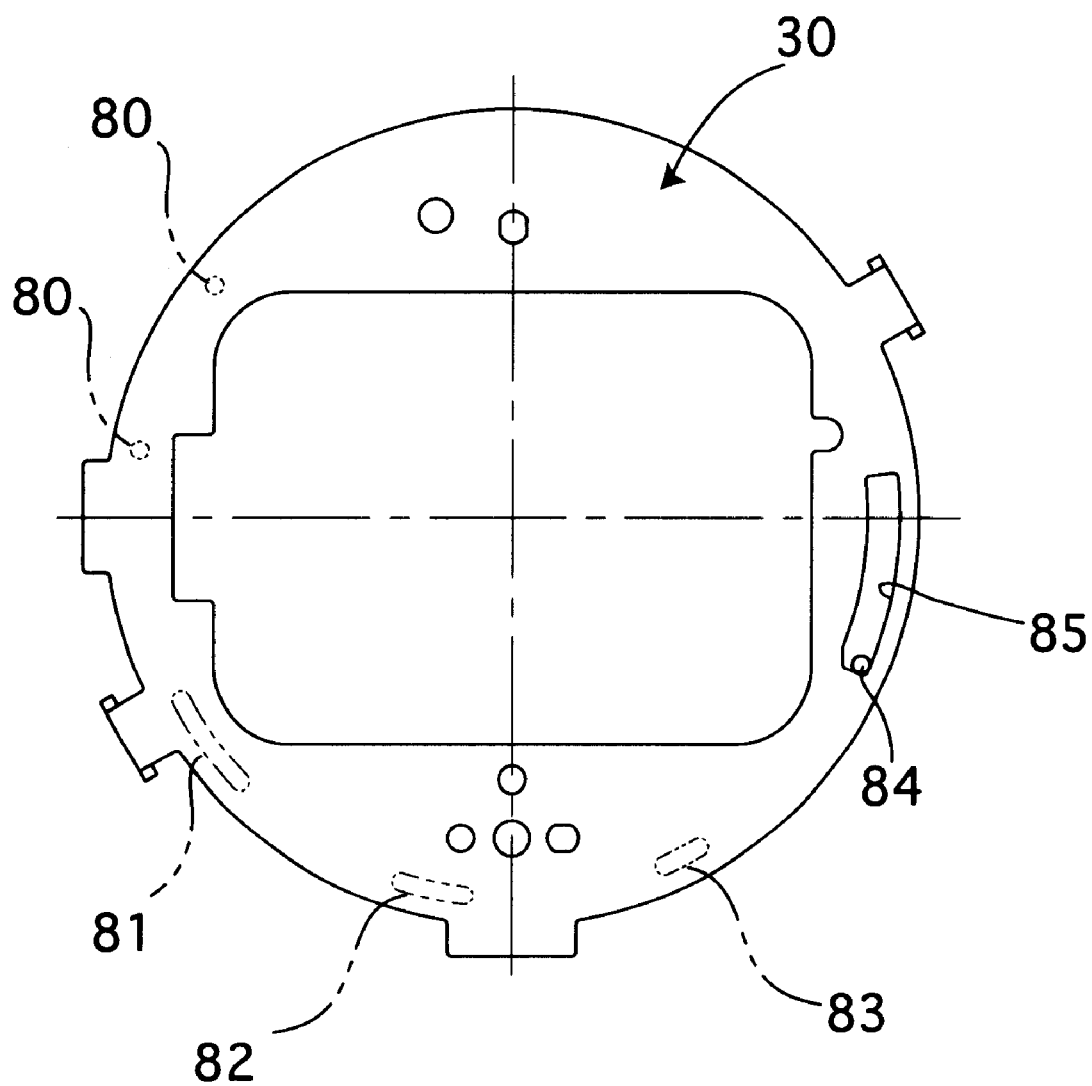
FIG. 22 is a rear end view of a cam ring and a linear movement guide plate, showing a relative angular position therebetween, at the other end of the effective cam groove area, in a telephoto step position of a zoom lens barrel.

Likewise, when the step indexes 82 through 84 are entirely viewed through the index view window 85, the second lens group L2 is guided using the effective cam groove area 56-2, 56-3, and 56-4 (step grooves 50-i and the opposed adjustment areas 50a), respectively. For example, FIGS. 17 and 18 show the relative angular position of the cam ring 25 and the linear movement guide plate 30 when the cam roller 49 is located at the positions A2 and B2 in the second feed stage of the zoom lens barrel 11, respectively. FIGS. 19 and 20 show the relative angular position of the cam ring 25 and the linear movement guide plate 30 when the cam roller 49 is located at the positions A3 and B3 in the third feed stage of the zoom lens barrel 11, respectively. FIGS. 21 and 22 show the relative angular position of the cam ring 25 and the linear movement guide plate 30 when the cam roller 49 is located at the positions A4 and B4 in the telephoto extremity step of the zoom lens barrel 11, respectively.

As can be understood from the foregoing, in the actual focusing operation in each focal length step, the object can be focused over the overall object distance from the infinite distance to the closest distance, using the step grooves 50-i having a width narrower than the entire effective cam groove area 56-i. The adjustment areas 50a that are shaped so as not to affect the focusing function at each focal length step are provided on opposite sides of each step groove 50-i. Consequently, if the area portion of the cam to be used is predetermined so as to be slightly deviated from the position of the step grooves 50-i, due to a focus adjustment or a mechanical error, focusing can be carried out as long as the portion is located within the adjustment areas 50a. In the embodiment of the present invention, the deviation of the portion of the cam groove actually used from the position of the step groove 50-i and the room in the effective cam groove area 56-i can be easily detected by viewing the appearance of the indexes 80 through 84 of the cam ring 25 through the index view window 85 formed in the linear movement guide plate 30.

For instance, if there is not much room in the effective cam groove area 56-i in the step as a result of the focus adjustment including the zooming adjustment and the back-focus adjustment by rotating the cam ring 25, the fact that there is not much room can be easily confirmed in the present invention, and hence, it is possible to take necessary countermeasures prior to the occurrence of a defocus state. In this case, in the zoom lens barrel 11 of the present invention, it is possible to adjust the axial position of the first lens group L1 in order to provide the effect corresponding to the zooming adjustment to thereby reduce the burden of the adjustment by the cam grooves.

Moreover, if the cam roller 49 enters the transfer area 50b or 50d or the introduction portion 50e of the second lens guide cam groove 50 in each focal length step when the lens barrel is assembled, a defocus state occurs. However, according to the embodiment of the present invention, since the appropriateness or inappropriateness of the angular position of the cam ring 25 at each focal length step can be checked, it is possible to easily determine the cause of a defocus state.

For example, if the code plate 51 is slightly deviated from the correct position in the optical axis direction, the detection timing of each focal length step is deviated, thus resulting in failure to control the angular position of the cam ring 25 correctly. If the deviation of the angular displacement of the cam ring 25 in each focal length step is too large to adjust by the adjustment areas 50a of the effective cam groove areas 56-i, a defocus state occurs. In case of a defocus state caused by the deviation of the rotation angle of the cam ring 25, if the focusing is carried out for the overall focal length from the infinite distance to the closest distance at each focal length step defined by the focal length detection device constructed from the code plate 15 and the brush 52, the indexes 81 through 84 of the cam ring 25 which could be either partly or entirely hidden by the linear movement guide plate 30 at a specific object distance even within one of the focal length steps. Moreover, in the retracted position of the lens barrel, the pair of accommodation area indexes 80 cannot be viewed at one time within the index view window 85. This means that the area other than the effective cam groove areas 56-i of the cam ring 25 at each focal length step is being used, and this can be easily recognized by viewing the state of the indexes 80 through 84 of the cam ring 25 within the index view window 85. For example, when the cam ring 25 is rotated to focus on the closest object at the wide angle step, if the wide angle step index 81 is moved downward (in the clockwise direction) with respect to the position shown in FIG. 16, so that a part of the index 81 is hidden by the linear movement guide plate 30, the cam ring 25 is excessively moved forward (in the clockwise direction) and the cam roller 49 has entered the next transfer area 50b.

The above discussion has been addressed chiefly to the cam ring 25 and the second lens group L2. The deviation of the angular position of the cam ring 25 also causes a deviation of the axial position of the first lens group L1 which is moved along a linear path in accordance with the angular displacement of the cam ring 25 through the helicoids 45 and 46. Therefore, in the illustrated embodiment, whether or not the zoom lens system including the second lens group L2 and the first lens group L1 is located at an appropriate position can be easily confirmed.

Conversely, if it is found that the angular position of the cam ring 25 at each focal length step is correct by confirming the positions of the indexes 80 through 84 via the index window 85, it can be determined that a defocus state is caused by other causes. Thus, at least the angular position of the cam ring 25 can be excluded from a possible cause of a defocus state.

As can be understood from the above discussion, the angular displacement of the cam ring 25 at each focal length step can b e confirm ed by viewing the state of the indexes 80 through 84 of the cam ring 25 within the index window 85. Consequently, the state of use of the second lens guide cam groove 50 at each focal length step can be confirmed. Furthermore, such confirmation can be easily carried out from behind the lens barrel 11 without disassembling the same.

As can be understood from the above discussion, in the step zoom lens camera according to the present invention, the indexes 81 through 84 (step portion indicating portions) which represent the focal length steps are formed on the rear surface of the cam ring 25, and the index view window 85 is formed on the linear movement guide plate 30 which is guided to move linearly, so that the indexes 81 through 84 are exposed through the index view window 85 when the cam roller 49 is moved in the effective cam groove areas 56-i (step area). Consequently, the angular displacement of the cam ring 25 and the portion of the second lens guide cam groove 50 that is used can be easily detected. Therefore, it is possible to prevent a defocus state from occurring during the assembling operation of the camera via a simple structure, and if a defocus state occurs, the cause can be easily discovered.

The step zoom lens camera according to the present invention is not limited to the illustrated embodiments. For example, although the above discussion has been addressed to a two-feed stage zoom lens having two lens groups, the lens arrangement or the number of the feed stages is not limited to specific one and the invention can be applied to any type of step zoom lens camera in which the focusing operation is carried out by rotating the cam ring.

According to the above description, a simple step zoom lens camera in which the state of use of the cam groove or the angular position of the cam ring can be easily and visually confirmed can be attained.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A step zoom lens camera comprising:

a rotatable cam ring;

a cam groove formed on the cam ring, said cam groove comprising a plurality of step areas, formed by splitting a focal length from the wide angle extremity to the telephoto extremity, and transit areas which connect said plurality of step areas to form a step zoom path;

a linear movement member which is connected to the cam ring so as to rotate relative thereto and to move together in the optical axis direction; and a cam-guided lens group which is guided by the linear movement member to move linearly in the optical axis direction in accordance with the cam groove so as to move to an in-focus position of an object, from an infinite object distance to a closest object distance, within each step area of said cam groove;

wherein said cam ring is provided on the rear end surface thereof with a plurality of step area indicating indexes which are spaced from one another in the circumferential direction to represent the corresponding step areas; and wherein said linear movement member is provided with a reference index at a predetermined circumferential position thereof, so that the position of use of the cam groove can be visually confirmed by viewing the position of the step area indicating indexes relative to the reference index.

2. The step zoom lens camera according to claim 1, further comprising a focusing lens group which serves as a variable power lens group, in addition to the cam-guided lens group which is guided by the cam groove, said focusing lens group being moved in the optical axis direction in a linear relationship to the angular displacement of the cam ring when the cam ring is rotated.

3. The step zoom lens camera according to claim 1, wherein said linear movement member comprises an annular portion which covers the rear end surface of the cam ring;

wherein said reference index comprises a window which extends through the annular portion and which is elongated in the circumferential direction; and wherein said cam-guided lens group is guided in each step area of the cam groove when each step area indicating index is located in the window.

4. The step zoom lens camera according to claim 3, wherein each of said step area indicating indexes comprises a recess formed on the rear end surface of the cam ring.

5. The step zoom lens camera according to claim 1, wherein said cam groove is provided with an accommodation area which is adapted to hold the cam-guided lens group in an accommodation position at which no photographic exposure is carried out;

said cam ring is provided on the rear end surface thereof with an accommodation area indicating index which represents the position of the accommodation area in the circumferential direction.

6. The step zoom lens camera according to claim 1, wherein each step area of the cam groove comprises:

a focusing area in which the cam-guided lens group is moved to a focal position in which an object from an infinite distance to the closest distance can be focused on, in accordance with the rotation of the cam ring, and adjustment areas which are provided on opposite sides of said focusing area and which are adapted to move the cam-guided lens group in the optical axis direction while maintaining a focusing function, when the angular position of the cam ring is changed.

7. The step zoom lens camera according to claim 3, wherein said step areas of the cam groove have different lengths in the circumferential direction, wherein a length of said window in the circumferential direction corresponds to a longest step area of said step areas, and wherein each said step area indicating indexes is positioned at one and the other ends of said window when said cam-guided lens group is guided at a corresponding one and the other ends of each corresponding said step area.

8. The step zoom lens camera according to claim 7, wherein said step area indicating indexes have different lengths in the circumferential direction.

9. A step zoom lens camera, in which the focal length from the telephoto extremity to the wide angle extremity is split into a finite number of focal length steps, so that a zoom lens system can be moved to a focal position in which an object from a infinite distance to the closest distance can be focused on, by controlling the angular displacement of a cam ring with a cam groove at each focal length step to vary the focal length;

wherein said cam ring is provided on the rear end surface thereof with a plurality of step indicating indexes which are spaced from one another in the circumferential direction to represent the angular position of the cam ring corresponding to the focal length steps;

wherein a linear movement member is provided with a reference index at a predetermined circumferential position thereof, said linear movement member is connected to the cam ring so as to rotate relative thereto and to move together in the optical axis direction;

wherein the angular position of the cam groove at each focal length step can be visually confirmed by viewing the relative position of the step indicating indexes relative to the reference index.

* * * * *